US012751354B2

(12) United States Patent
Nevels

(10) Patent No.: US 12,751,354 B2
(45) Date of Patent: Oct. 6, 2026

(54) FLEXIBLE ROTARY CUTTING DEVICE AND METHOD

(71) Applicant: Richard Nevels, Sulphur Springs, AR (US)

(72) Inventor: Richard Nevels, Sulphur Springs, AR (US)

( * ) Notice: Subject to any disclaimer, the term of this patent is extended or adjusted under 35 U.S.C. 154(b) by 0 days.

(21) Appl. No.: 18/883,642

(22) Filed: Sep. 12, 2024

(65) Prior Publication Data

US 2026/0068812 A1 Mar. 12, 2026

(51) Int. Cl.
*A01D 34/416* (2006.01)
*A01D 101/00* (2006.01)

(52) U.S. Cl.
CPC ..... *A01D 34/4166* (2013.01); *A01D 34/4165* (2013.01); *A01D 2101/00* (2013.01)

(58) Field of Classification Search
CPC ............ A01D 34/4166; A01D 34/4168; A01D 34/416
See application file for complete search history.

(56) References Cited

U.S. PATENT DOCUMENTS 3,564,824 A 2/1971 Tygh, Jr.
4,086,700 A 5/1978 Inada
4,189,905 A * 2/1980 Frantello .............. A01D 34/416 30/276
4,362,007 A 12/1982 Kennedy et al.
4,584,771 A 4/1986 Tillotson
4,651,421 A 3/1987 Zerrer
5,651,418 A 7/1997 Jerez
5,758,424 A * 6/1998 Iacona ............... A01D 34/4166 30/276
5,887,348 A 3/1999 Iacona et al.
(Continued)

FOREIGN PATENT DOCUMENTS

EP 1421840 A1 * 5/2004 ......... A01D 34/4166
GB 2028089 3/1980

OTHER PUBLICATIONS

Pressbooks; "Centripetal force"; retrieved on Aug. 29, 2025 from https://pressbooks.bccampus.au/universityphysicssandbox/chapter/centripetal-force/.
(Continued)

*Primary Examiner* — Alicia Torres
(74) *Attorney, Agent, or Firm* — Robert H. Frantz

(57) ABSTRACT

A flexible rotary cutting device useful for attaching to a rotary drive configured to trim vegetation, particularly a lawn mower. The flexible rotary cutting device includes a cutting head, an attachment mechanism, at least one cutting-filament retention mechanisms, and at least one cutting-filament. At least one cutting-filament may be releasably attached to the at least one cutting-filament retention mechanism. The at least one cutting-filament may be configured to sever vegetation as the cutting head is rotated, and may be positioned such that it is passed through the at least one filament-aperture, and between the first-filament engaging pawl and the second-filament engaging pawl, in such a way that the at least one cutting-filament is engaged and anchored by the first-plurality of teeth and the second-plurality of teeth, and extends radially from the outer flange of the cutting head.

9 Claims, 35 Drawing Sheets

(56) References Cited

U.S. PATENT DOCUMENTS

| | | | | |
|---|---|---|---|---|
| 6,519,857 | B1 * | 2/2003 | Proulx | A01D 34/416 30/276 |
| 6,722,114 | B1 | 4/2004 | Poole et al. | |
| 6,928,741 | B2 | 8/2005 | Proulx et al. | |
| 8,028,424 | B2 * | 10/2011 | Legrand | A01D 34/4166 30/276 |
| 8,061,042 | B2 * | 11/2011 | Arnetoli | A01D 34/4166 30/276 |
| 8,307,558 | B2 | 11/2012 | Allis | |
| 8,341,847 | B2 | 1/2013 | Kato | |
| 2001/0003935 | A1 | 6/2001 | Morabit et al. | |
| 2004/0237315 | A1 | 12/2004 | Alliss | |
| 2006/0026846 | A1 | 2/2006 | Alliss | |
| 2006/0048395 | A1 * | 3/2006 | Legrand | A01D 34/4166 30/276 |
| 2007/0084061 | A1 | 4/2007 | Bennett | |
| 2008/0083120 | A1 | 4/2008 | Alliss | |
| 2018/0199507 | A1 | 7/2018 | Nevels | |

OTHER PUBLICATIONS

BHHC Safety Center; String Trimmers (Weed Whips) and Edgers—Landscaping Stats and Facts:; Retrieved on Aug. 29, 2025 from https://bhhcsafetycenter.com/string-trimmers-weed-whips-and-edgers-landscaping-stats-and-facts/.

Jennisen, et al.; "Pediatric lawn mower-related injuries and contributing factors for bystander injuries"; Injury Epidemiology 2023, 10(Suppl 1):51; published at https://doi.org/10.1186/s40621-023-00468-z.

* cited by examiner

FLEXIBLE ROTARY CUTTING DEVICE AND METHOD

CROSS-REFERENCE TO RELATED APPLICATION(S)

The present application a continuation-in-part of U.S. patent application Ser. No. 18/072,046, filed Nov. 30, 2022, which is a continuation-in-part of U.S. patent application Ser. No. 16/670,451, filed Oct. 31, 2019, which is a continuation-in-part of U.S. patent application Ser. No. 15/872,941 filed Jan. 16, 2018, which is related to and claims priority to U.S. Provisional Patent Application Number 62/446,221 filed Jan. 13, 2017, all of which are incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of cutting devices of existing art and more specifically relates to lawnmower blades.

RELATED ART

Many homeowners use lawnmowers to cut grass. A lawn mower is a machine utilizing one or more revolving blades to cut a grass surface to an even height. The height of the cut grass is adjustable by the operator, typically by a single master lever, or by a lever or nut and bolt on each of the machine's wheels. Lawn mowers may employ a single blade that rotates about a single vertical axis, or a cutting bar and multiple blade assembly that rotates about a single horizontal axis. Mowing with a standard fixed/solid blade on all types of terrain can cause damage to the blade and the housing. A fixed blade is sufficient when mowing level grass, however rocky or rough terrain can result in broken blades, projectile objects being thrown, injuries, and more. Replacing or repairing the blades and damage to the housing can be costly and time consuming. An efficient solution is needed.

U.S. Pat. No. 4,086,700 to Kiichi Inada relates to a cutting head for a mower. The described cutting head for a mower includes a cutter for a lawn mower having a rotating disc for mounting on a driving mechanism, the disc having a cavity therein and two openings at diametrically opposite points in the periphery of the disc and opening out of the disc from the cavity.

SUMMARY OF THE INVENTION

In view of the foregoing disadvantages inherent in the known lawnmower blade art, the present disclosure provides a novel flexible rotary cutting device and method. The general purpose of the present disclosure, which will be described subsequently in greater detail, is to provide a flexible rotary cutting device efficient and effective for use.

A flexible rotary cutting device is disclosed herein. The flexible rotary cutting device is useful for attaching to a rotary drive configured to trim vegetation, particularly a lawn mower. The flexible rotary cutting device includes a cutting head, an attachment mechanism, at least one cutting-filament retention mechanisms, and at least one cutting-filament. The cutting head includes a disk, and outer flange affixed to the disk, a cover affixed to the outer flange, and a rotational axis passing through the center of the disk defining the axis of rotation of the flexible rotary cutting device. The outer flange may circumscribe an inner volume defined within the cutting head. An attachment mechanism is affixed to the cutting head, and serves to enable the cutting head to be releasably attached to the rotary drive. The at least one cutting-filament retention mechanism may include a first-fulcrum cylinder having a first-fulcrum axis affixed to the cutting head, such that the first-fulcrum axis is parallel but not concentric to the rotational axis. A second-fulcrum cylinder having a second-fulcrum axis may be likewise affixed to the cutting head, the second-fulcrum axis also being parallel but not concentric to the rotational axis. The at least one cutting-filament retention mechanism may further include a first-filament engaging pawl pivotably engaging the first-fulcrum cylinder having a first-plurality of teeth, and a second-filament engaging pawl pivotably engaging the second-fulcrum cylinder having a second-plurality of teeth. The second-filament engaging pawl may be positioned opposite the first-filament engaging pawl, such that it mirrors the first-filament engaging pawl. At least one filament-aperture may be disposed within the outer flange of the cutting head.

At least one cutting-filament may be releasably attached to the at least one cutting-filament retention mechanism. The at least one cutting-filament may be configured to sever vegetation as the cutting head is rotated, and may be positioned such that it is passed through the at least one filament-aperture, and between the first-filament engaging pawl and the second-filament engaging pawl, in such a way that the at least one cutting-filament is engaged and anchored by the first-plurality of teeth and the second-plurality of teeth, and extends radially from the outer flange of the cutting head.

According to another embodiment, a method of trimming vegetation is also disclosed herein. The method of trimming vegetation includes firstly, providing the flexible rotary cutting device as described; secondly, coupling the attachment mechanism to the rotary drive; thirdly, inserting the at least one cutting-filament into the at least one cutting-filament retention mechanism; fourthly, rotating the rotary drive in order to rotate the cutting device in tandem with the rotary drive; fifthly, severing vegetation with the at least one cutting-filament as the at least one cutting-filament makes contact with vegetation; and sixthly and optionally, re-inserting the at least one cutting-filament into the at least one cutting-filament retention mechanism as the at least one cutting-filament is consumed.

According to yet another embodiment, a rotating cutting device is again disclosed. In this embodiment, the cutting device has at least one (though preferably multiple) cutting mechanisms which each use only a single retention cam for the cutting filament. All prior-known embodiments use at least two such cams. The use of the single cam, which rotates opposite of the rotation of the cutting head, reduces necessary components, allows for the use of lighter springs, and improves both the grip on the filament as well as the ease in removing the filament when used. Further improvements can include a toothed filament to correspond with the teeth on the single cam.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a flexible rotary cutting device and method, constructed and operative according to the teachings of the present disclosure.

The various embodiments of the present invention will hereinafter be described in conjunction with the appended drawings, wherein like designations denote like elements.

DETAILED DESCRIPTION

I. Introduction and Environment

Figure 1:
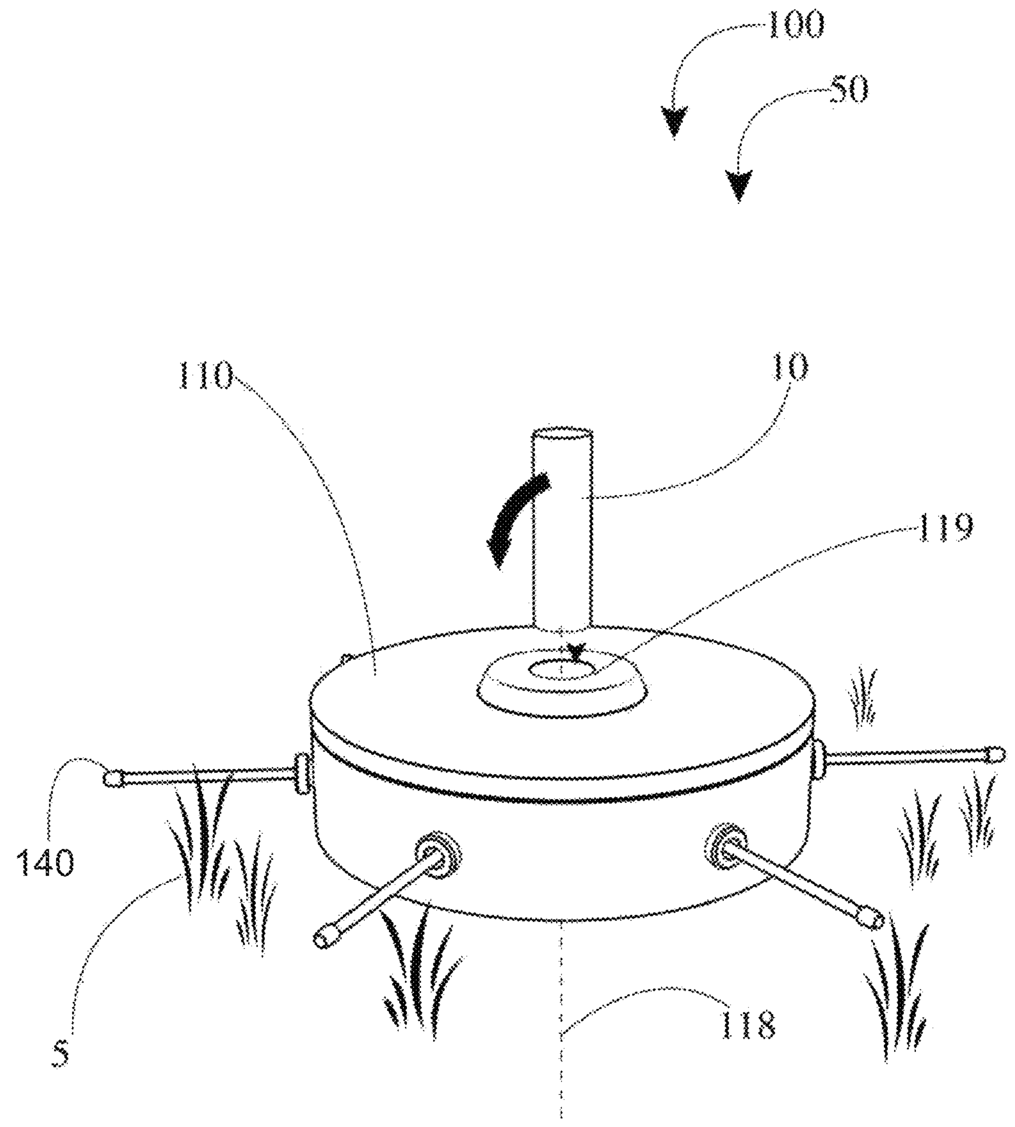
FIG. 1 is a perspective view of the flexible rotary cutting device during an 'in-use' condition, according to an embodiment of the disclosure.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Cutting Head System 100

As discussed above, embodiments of the present disclosure relate to a lawnmower blade and more particularly to a flexible rotary cutting device and method as used to improve the trimming of vegetation.

Generally, the flexible rotary cutting device provides an attachment to replace fixed blades on all types of lawnmowers with a flexible cutting device. It offers a non-solid blade type for mowing both normal lawns and vegetation over rough and rocky terrain. It affords housing protection for mowing in rough areas to prevent damage to cutting device housing. This prevents the mower blades, including those on push mowers, self-propelled mowers or tractors, from damage. The flexible rotary cutting device reduces the risk of many accidents, hazards, and injuries associated with fixed lawnmower blades.

The flexible rotary cutting device includes a flexible cutting-filament that has sufficient rigidity to sever vegetation, but enough flexibility that the cutting-filament will not sever non-vegetation materials, such as rocks and wood. The housing of the cutting device is preferably constructed of metal with smooth, rounded edges to decrease friction and prevent injury or damage due to collisions with the housing. The device may utilize a variety of flexible cutting-filaments made of nylon, cable, wire, or other suitable material that provides uniform cutting with flexibility when making contact with solid objects, such as rocks, sticks, and other hazards. The attachment may be equipped with any type of commonly used blade attachment type, such as the circular or star-shaped apertures often used in commercial lawnmowers. Some embodiments may include aperture-adapters that may allow a single unit of the flexible rotary cutting device to be used with multiple types of lawnmowers. The cutting-filament can be replaced as needed by the user by simply threading the cutting-filament into the housing of the cutting device. A cutting-filament retention mechanism within the housing allows the cutting-filament to be inserted inwards, but prevents the cutting-filament from moving outwards from the housing, thereby resisting centrifugal forces when the housing is spun at high speed. In this way, the cutting-filament may be reliably retained during use and yet easily replaced when the cutting-filament has been expended.

Referring now more specifically to the drawings by numerals of reference, there is shown in FIGS. 1-4, various views of a cutting device 100.

FIG. 1 shows a cutting device 100 during an 'in-use' condition 50, according to an embodiment of the present disclosure. Here, cutting device 100 may be beneficial for use by a user 40 to trim vegetation 5. As illustrated, cutting device 100 may be attachable to rotary drive 10, being configured to trim vegetation 5. Attachment mechanism 119 may be affixed to cutting head 110, attachment mechanism 119 enabling cutting head 110 to be releasably attached to rotary drive 10. Attachment mechanism 119 may comprise an aperture configured to receive and circumscribe rotary drive 10. Rotational axis 118 may pass through the center of disk 112, cutting head 110 and rotary drive 10 being rotatable about rotational axis 118 when in use. Upon reading this specification, it should be appreciated that, under appropriate circumstances, considering such issues as user preferences, design preference, structural requirements, marketing preferences, cost, available materials, technological advances, etc., other structural arrangements such as, for example, alternative cutting-filament orientations, cover attachment means, manufacturing methods, etc., may be sufficient.

According to one embodiment, the cutting device 100 may be arranged as a kit 105. In particular, the cutting device 100 may further include a set of instructions 107. The instructions 107 may detail functional relationships in relation to the structure of the cutting device 100 such that the cutting device 100 can be used, maintained, or the like, in a preferred manner.

Figure 2:
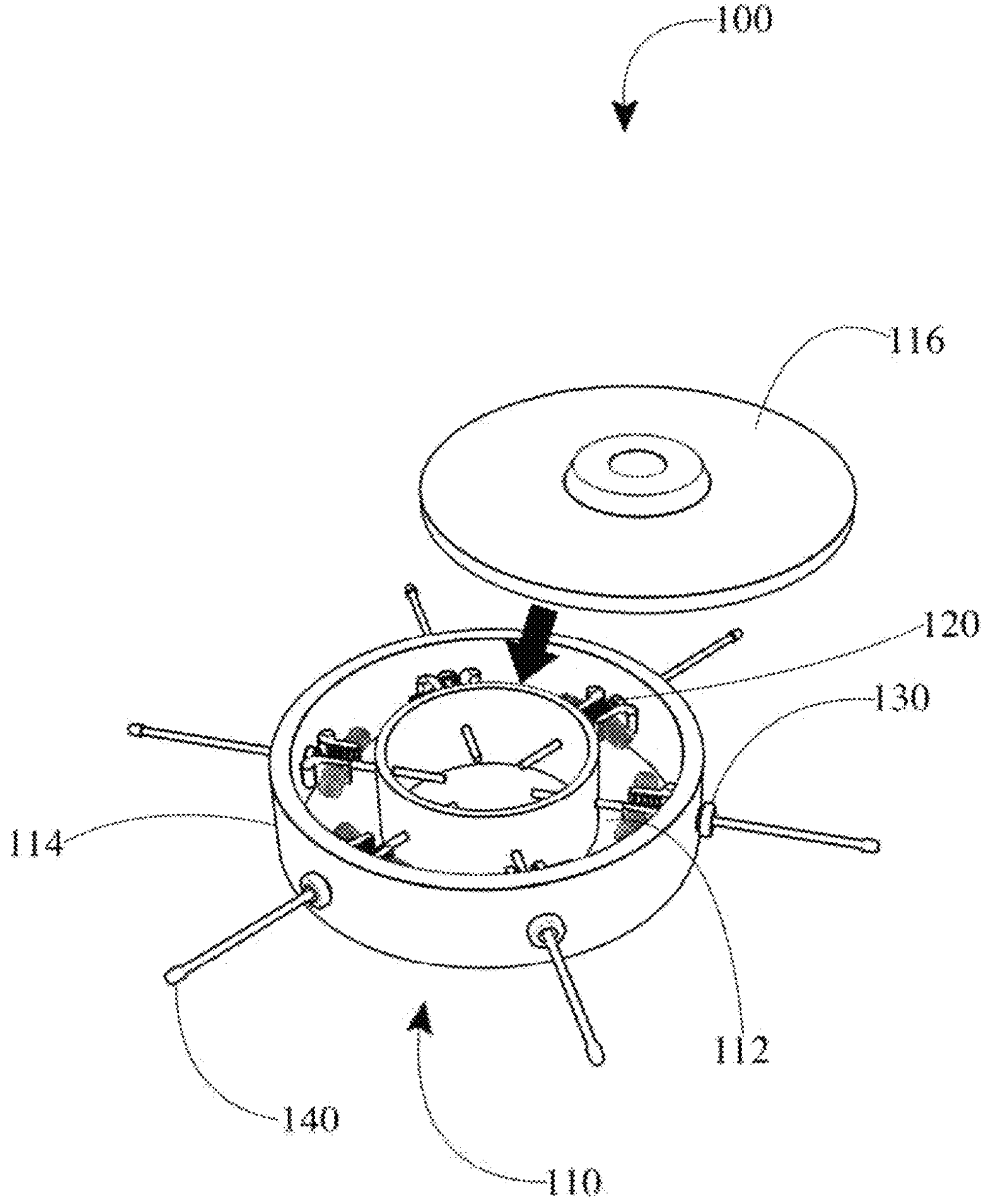
FIG. 2 is a perspective view of the flexible rotary cutting device of FIG. 1, according to an embodiment of the present disclosure.

FIG. 2 shows cutting device 100 of FIG. 1, according to an embodiment of the present disclosure. Cutting device 100 may include cutting head 110, at least one cutting-filament retention mechanism 120, at least one filament aperture 130, and at least one cutting-filament 140. Cutting head 110 may include disk 112, outer flange 114, cover 116. Outer flange 114 may be affixed to disk 112, outer flange 114 defining a cylindrical inner volume. Cover 116 may be affixed to outer flange 114, and may be concentric to disk 112. Cover 116 of cutting head 110 may be affixed to disk 112 of cutting head 110 via threaded fasteners. Disk 112 of cutting head 110, outer flange 114 of cutting head 110, and cover 116 of cutting head 110 may be joined with rounded seams. Cutting head 110 may be constructed of metal. At least one cutting-filament retention mechanism 120 may be affixed to cutting head 110. Six of at least one filament retention mechanism(s) may be disposed within cutting head 110, each of at least one filament retention mechanism 120 each being separated by sixty degrees. At least one filament-aperture 130 may be disposed within outer flange 114 of cutting head 110. At least one cutting-filament 140 may be releasably attached to at least one cutting-filament retention mechanism 120, at least one cutting-filament 140 being configured to sever vegetation 5 as cutting head 110 is rotated. At least one cutting-filament 140 may be passed through at least one filament-aperture 130, and between first-filament engaging pawl 126 and second-filament engaging pawl 126, such that at least one cutting-filament 140 extends radially from outer flange 114 of cutting head 110 when attached to at least one cutting-filament retention mechanism 120.

Figure 3:
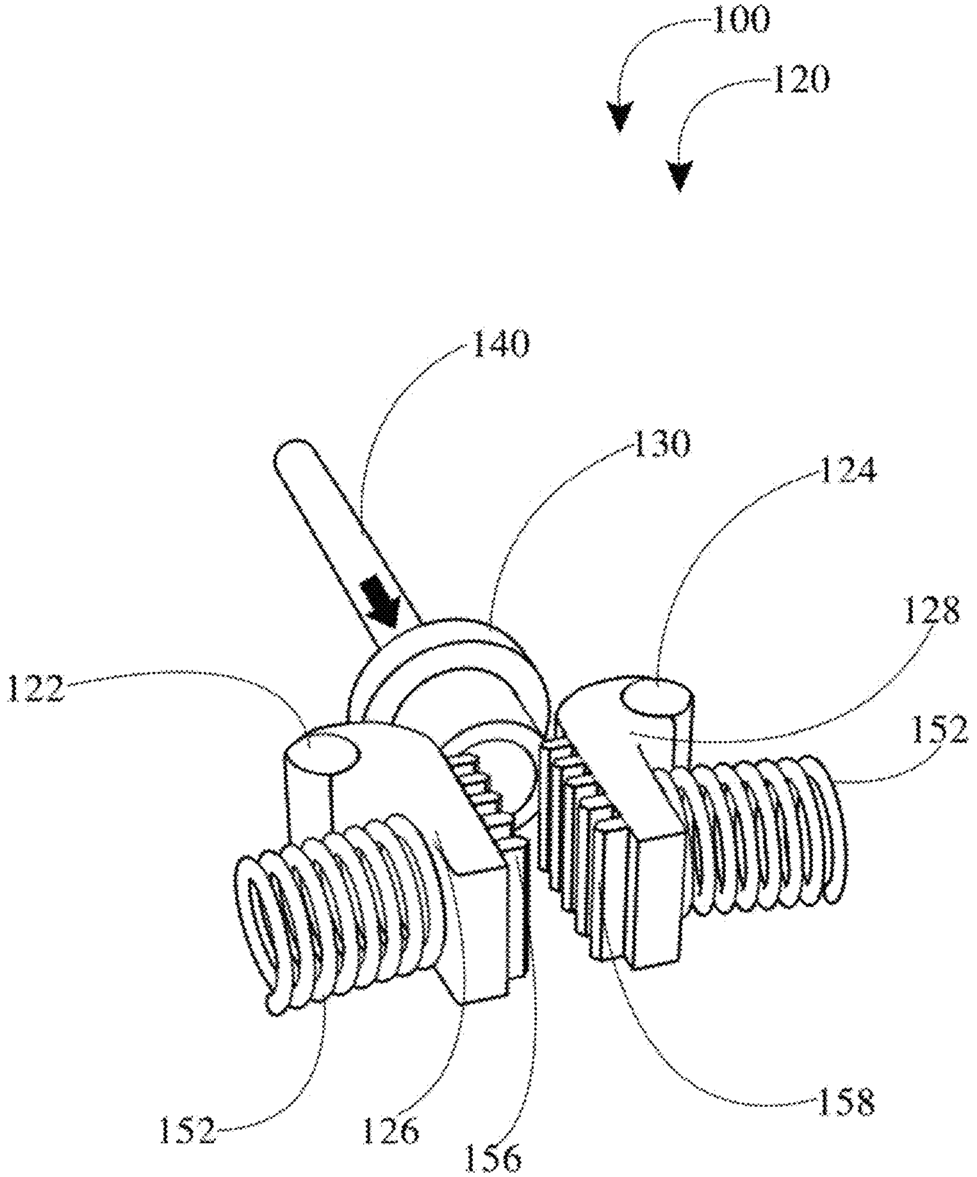
FIG. 3 is a perspective view of the flexible rotary cutting device of FIG. 1, according to an embodiment of the present disclosure.

FIG. 3 is a perspective views of cutting device 100 of FIG. 1, according to an embodiment of the present disclosure. At least one cutting-filament retention mechanism 120 may include first-fulcrum cylinder 122, second-fulcrum cylinder 124, first-filament engaging pawl 126, and second-filament engaging pawl 128. First-fulcrum cylinder 122 may have a first-fulcrum axis affixed to cutting head 110, and second-fulcrum cylinder 124 may likewise be affixed to cutting head 110. First-filament engaging pawl 126 may pivotably engage first-fulcrum cylinder 122 and may further include first-plurality of teeth 156. Likewise, second-filament engaging pawl 128 may pivotably engage second-fulcrum cylinder 124, and may have second-plurality of teeth 158, second-filament engaging pawl 128 mirroring first-filament engaging pawl 126. At least one cutting-filament 140 may be engaged and anchored by first-plurality of teeth 156 and second-plurality of teeth 158. At least one cutting-filament 140 may be releasably attached to at least one cutting-filament retention mechanism 120, at least one cutting-filament 140 being passed through at least one filament-aperture 130, and between first-filament engaging pawl 126 and second-filament engaging pawl 128, such that at least one cutting-filament 140 is engaged and anchored by first-plurality of teeth 156 and second-plurality of teeth 158, such that at least one cutting-filament 140 extends radially from outer flange 114 of cutting head 110. First-plurality of teeth 156 of first-filament engaging pawl 126 and second-plurality of teeth 158 of the second-filament engaging pawl 128 may each include five of said teeth. At least one cutting-filament retention mechanism 120 may further includes at least one pawl-spring engaging first-filament engaging pawl 126 and second-filament engaging pawl 128, at least one pawl-spring 152 being configured to push first-filament engaging pawl 126 and second-filament engaging pawl 128 into engagement towards each other. At least one pawl-spring 152 may comprise at least one coil spring.

Figure 4:
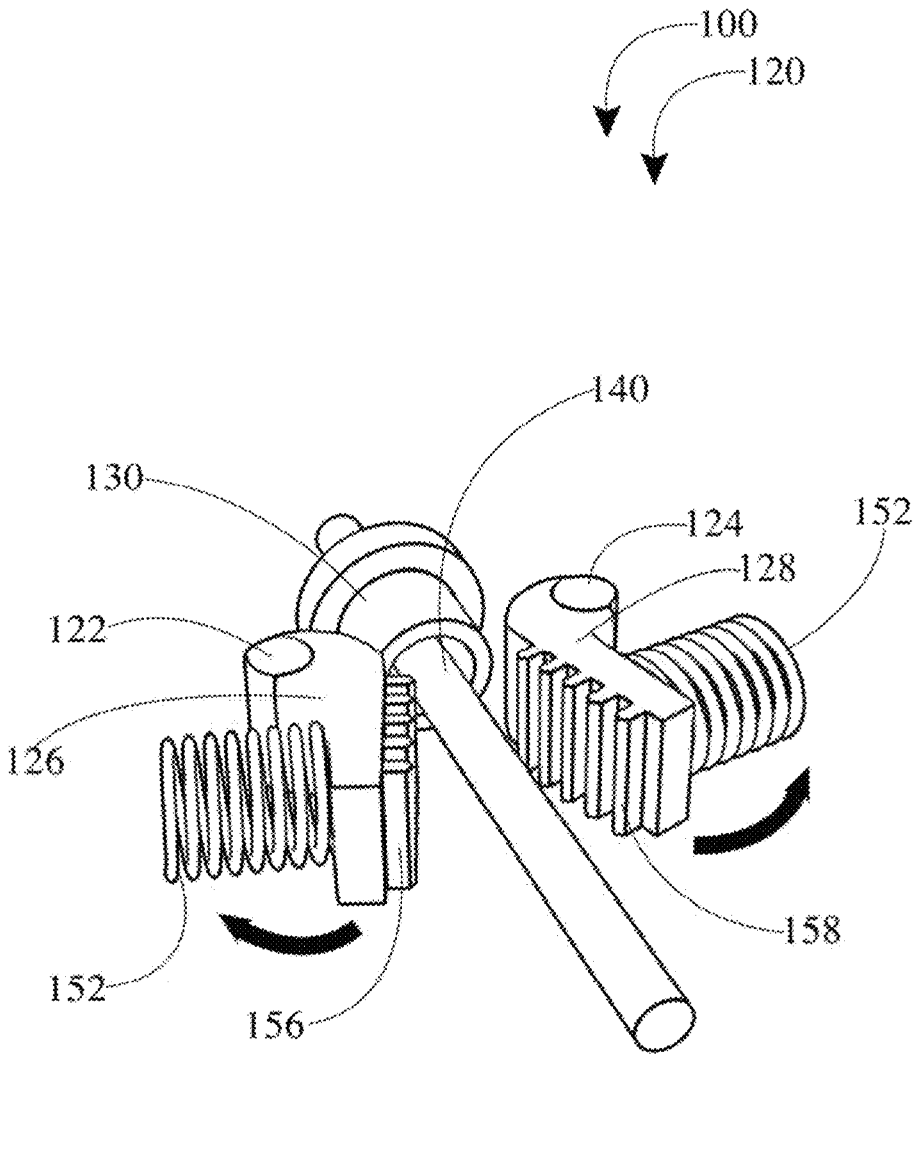
FIG. 4 is a perspective view of the flexible rotary cutting device of FIG. 1, according to an embodiment of the present disclosure.

Referring now to FIG. 4 showing a perspective views of cutting device 100 of FIG. 1, according to an embodiment of the present disclosure. As before, at least one cutting-filament retention mechanism 120 may include first-fulcrum cylinder 122, second-fulcrum cylinder 124, first-filament engaging pawl 126, and second-filament engaging pawl 128. At least one pawl-spring 152 is further configured to push first-filament engaging pawl 128 and second-filament engaging pawl 126 into engagement with at least one cutting-filament 140 when at least one cutting-filament 140 is passed between first-filament engaging pawl 126 and second-filament engaging pawl 128. First-plurality of teeth 156 of first-filament engaging pawl 128 mirrors second-plurality of teeth 158 of second-filament engaging pawl 128, first-plurality of teeth 156 of first-filament engaging pawl 126 and second-plurality of teeth 158 of second-filament engaging pawl 126 being disposed towards each other, such that first-plurality of teeth 156 of first-filament engaging pawl 128 and second-plurality of teeth 158 of second-filament engaging pawl 126 engage at least one cutting-filament 140 when at least one cutting-filament 140 is releasably attached to at least one cutting-filament retention mechanism 120.

First-plurality of teeth 156 of first-filament engaging pawl 126 and second-plurality of teeth 158 of second-filament engaging pawl 128 may be angled in a radially outward direction with respect to disk 112 of cutting head 110, first-plurality of teeth 156 of first-filament engaging pawl 126 and second-plurality of teeth 158 of second-filament engaging pawl 128 being configured to resist movement of at least one cutting-filament 140 only in a radially outward direction. Additionally, first-filament engaging pawl 126 and second-filament engaging pawl 128 are pointed away from first-fulcrum cylinder 122 and second-fulcrum cylinder 124 in a radially inward direction with respect to disk 112 of cutting head 110, such that first-filament engaging pawl 126 and second-filament engaging pawl 128 are able to pivot away from each other when at least one cutting-filament 140 is pushed between them from a radially outward direction with respect to disk 112 of cutting head 110, first-plurality of teeth 156 of first-filament engaging pawl 126 and second-plurality of teeth 158 of the second-filament engaging pawl 128 being configured to resist movement of at least one cutting-filament 140 only in said radially outward direction.

Figure 5:
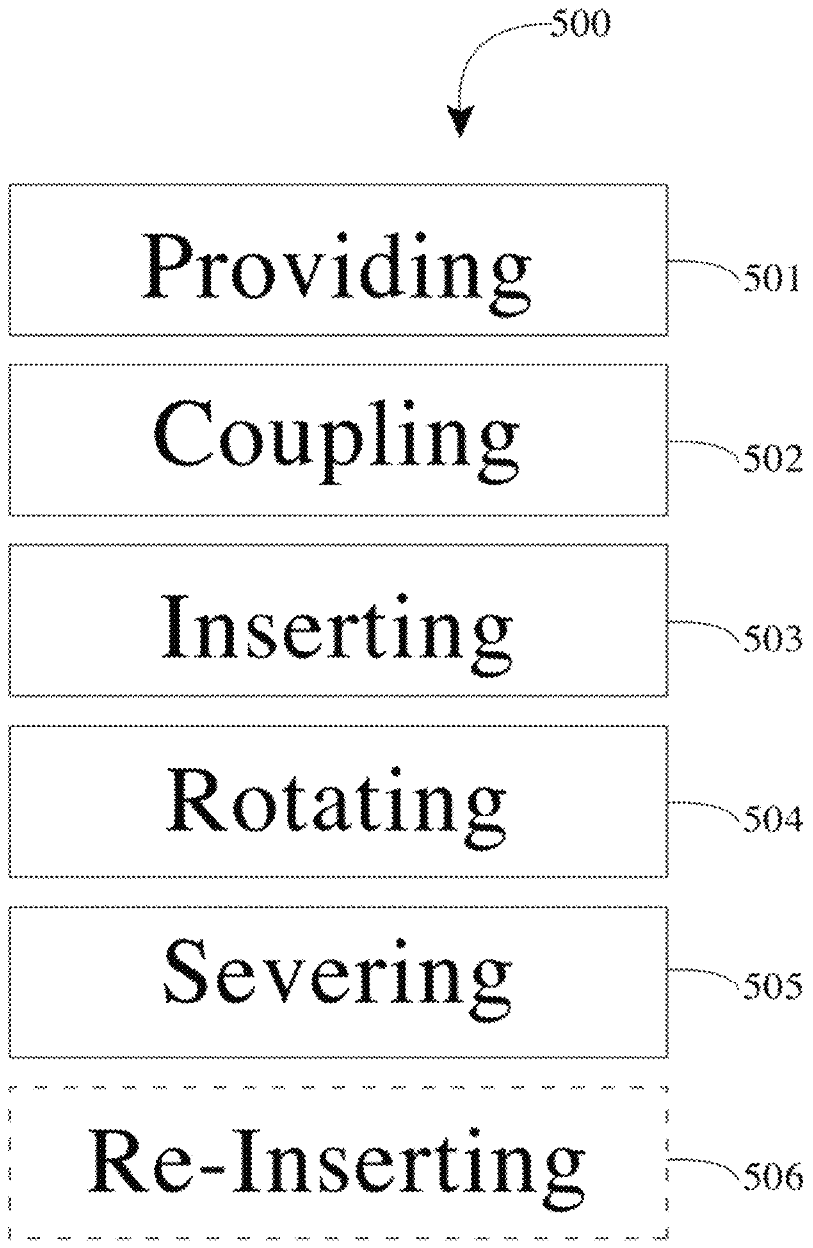
FIG. 5 is a flow diagram illustrating a method of use for trimming vegetation, according to an embodiment of the present disclosure.

FIG. 5 is a flow diagram illustrating a method for trimming vegetation 500, according to an embodiment of the present disclosure. In particular, the method for trimming vegetation 500 may include one or more components or features of the cutting device 100 as described above. As illustrated, the method for trimming vegetation 500 may include the steps of: step one 501, providing a cutting device attachable to a rotary drive configured to trim vegetation as disclosed; step two 502, coupling the attachment mechanism to the rotary drive; step three 503, inserting the at least one cutting-filament into the at least one cutting-filament retention mechanism; step four 504, rotating the rotary drive in order to rotate the cutting device in tandem with the rotary drive; step five 505, severing vegetation with the at least one cutting-filament as the at least one cutting-filament makes contact with vegetation; and optionally, step six 506, re-inserting the at least one cutting-filament into the at least one cutting-filament retention mechanism as the at least one cutting-filament is consumed.

It should be noted that step 506 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S. C. § 112(f). It should also be noted that, under appropriate circumstances, considering such issues as design preference, user preferences, marketing preferences, cost, structural requirements, available materials, technological advances, etc., other methods and means for trimming vegetation, are taught herein.

III. Alternative Embodiment Cutting Head System 602

Figure 6:
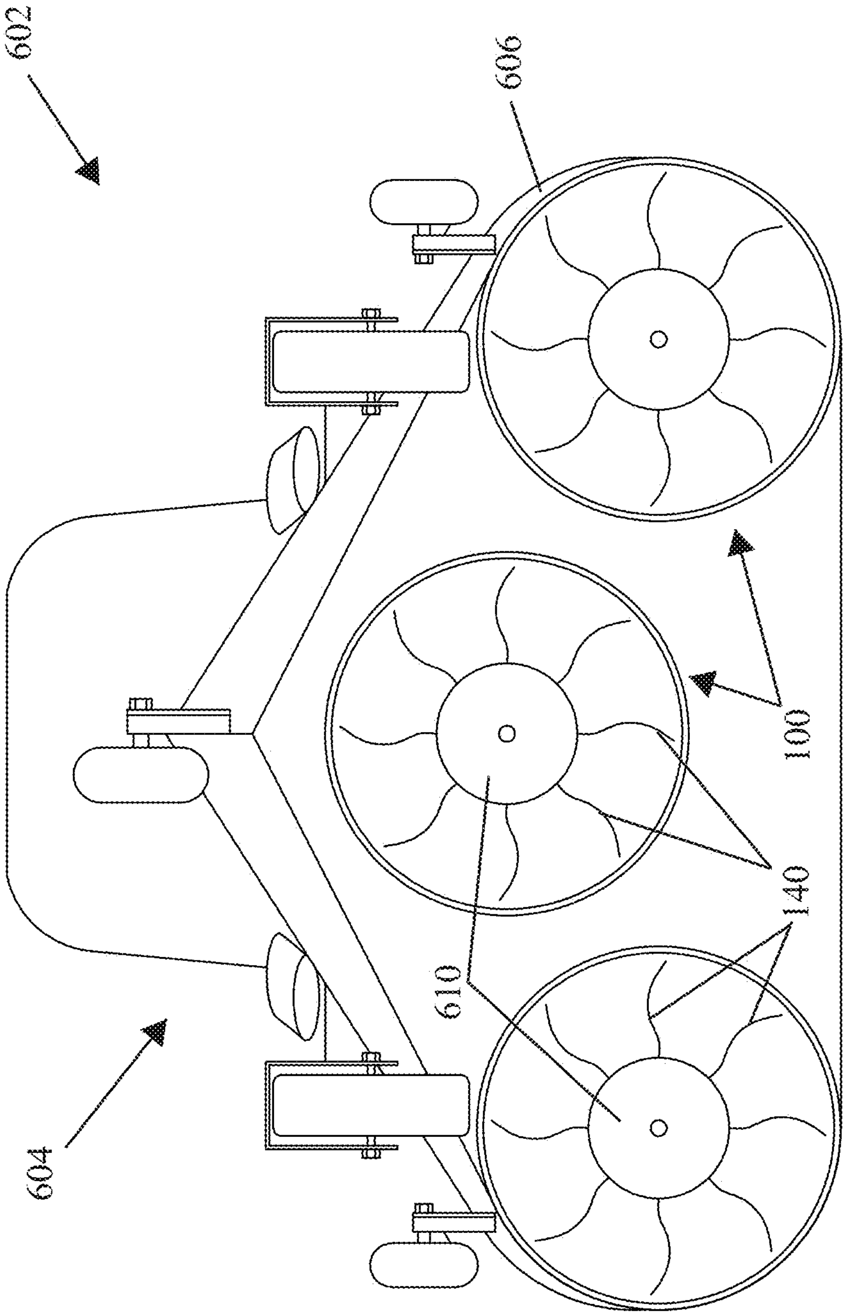
FIG. 6 is a front elevational view of an alternative embodiment of the present invention shown installed into a typical environment of a mower deck.

FIG. 6 shows a slightly alternative embodiment of the present invention lawnmower cutting system 602 which shows in more detail how the cutting device 100 integrates with a lawn mower 604 deck 606. As shown, multiple of the cutting devices 100 can replace traditional lawn mower blades, using the cutting filaments 140 as the cutting source. FIGS. 7-14 also show slightly modified cutting heads 610 which use various spacers to integrate with most existing lawn mowers.

Figure 7:
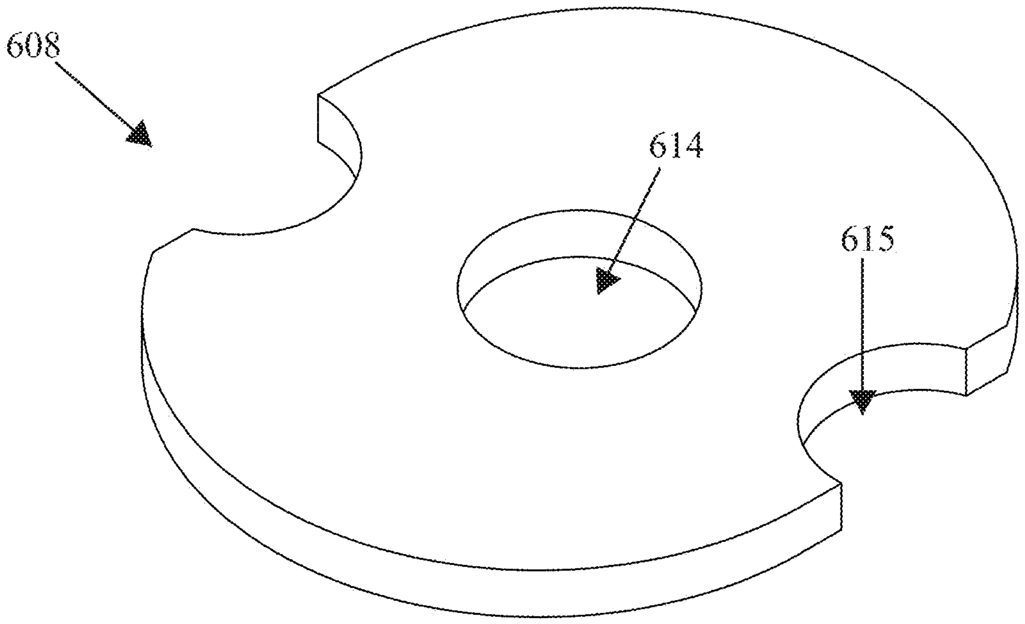
FIG. 7 is three-dimensional isometric view of a spacer element used in the embodiment thereof.
Figure 8:
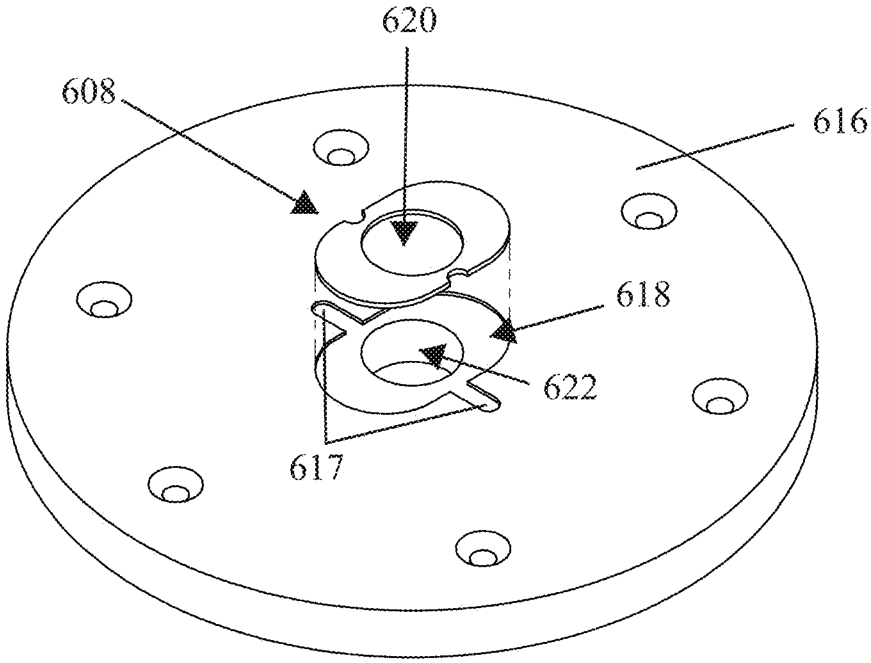
FIG. 8 is a partially exploded three-dimensional isometric view of the spacer element of FIG. 7 inserted into a cutting head element of the embodiment thereof.

FIG. 7 shows such a spacer 608 which can be placed, either temporarily or permanently, into the cover 616 of the cutting head 610 as shown in FIG. 8. A central receiver 620 connects to the rotary drive 10 of the lawn mower 604. It lines up over the receiver 622 of the cutting head 610 cover 616. A pair of surface reliefs 617 extend from a central relief 618, the pair of surface reliefs 617 line up with the edge reliefs 615 on the spacer, which allows for easy alignment and removal of the spacer with the cover 616. FIGS. 9-12 show alternative spacers 608.1, 608.2, 608.3, 608.4 having alternative receiver shapes 620.1, 620.2, 620.3, 620.4 for connection to different lawn mower rotary drive 10 types.

Figure 13:
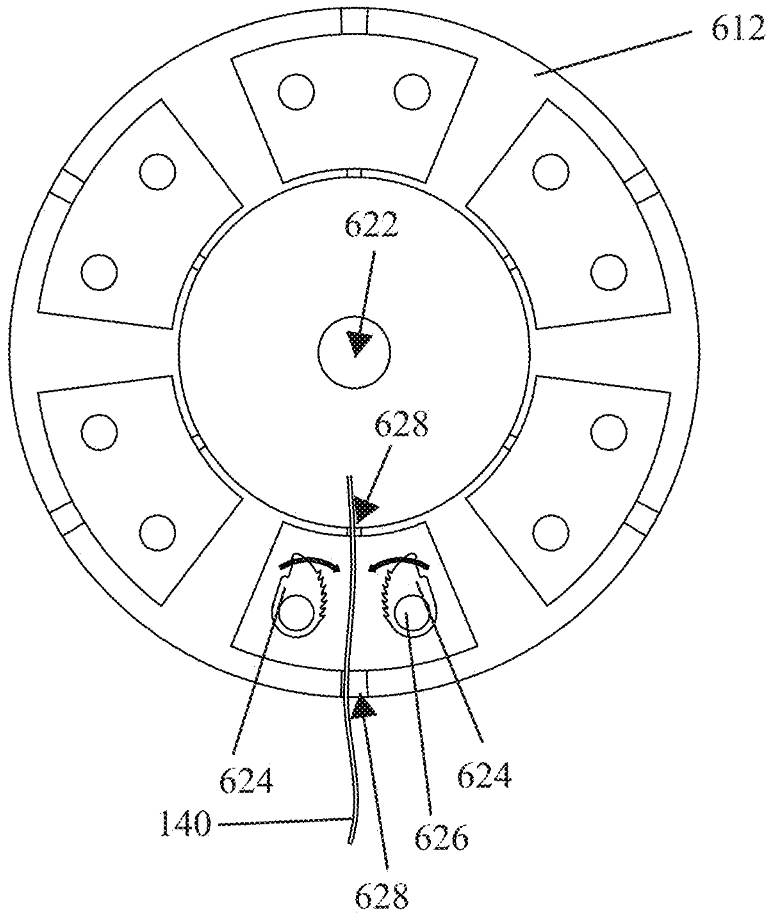
FIG. 13 is a top plan view of a bottom enclosure of the cutting head element thereof.
Figure 14:
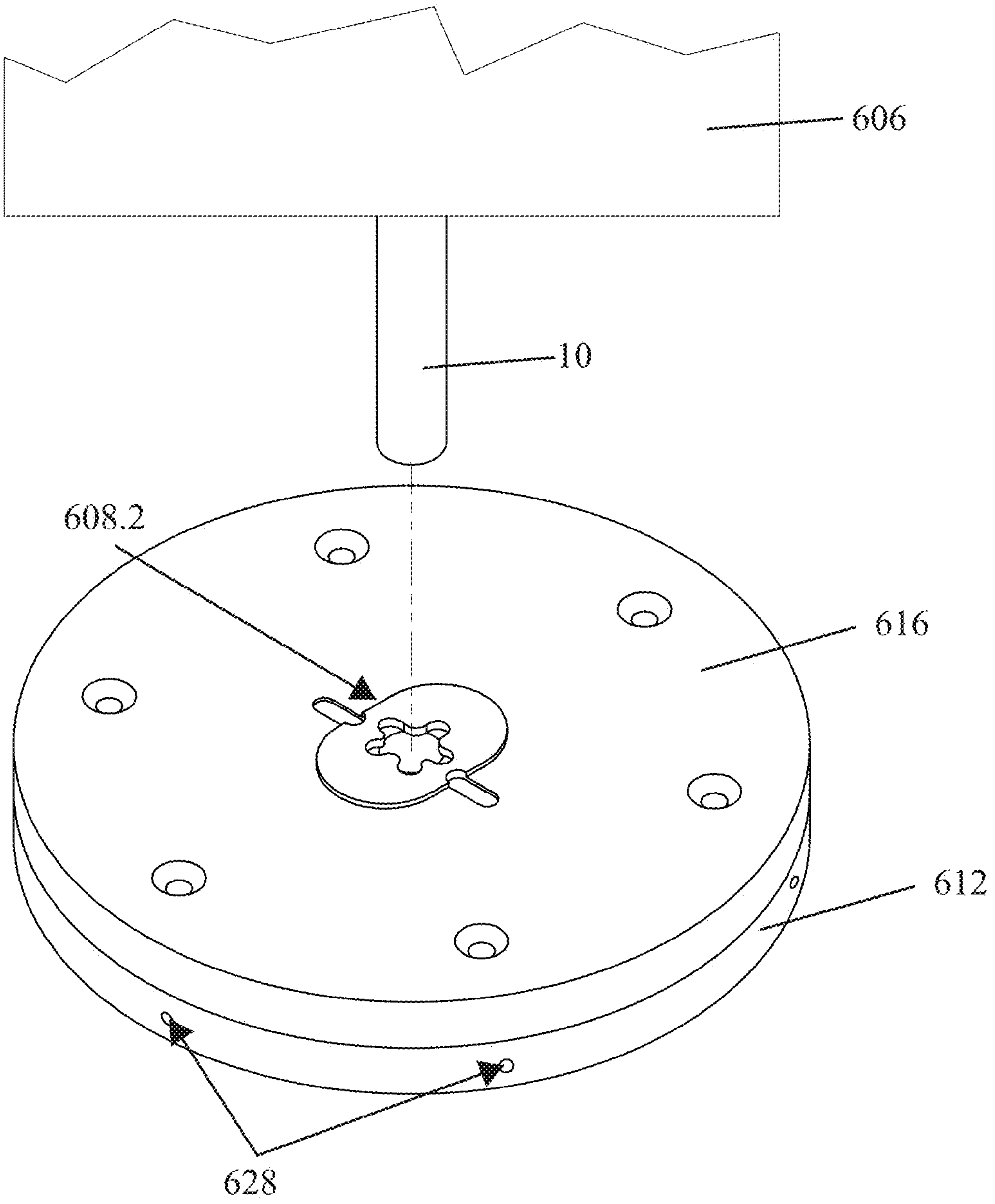
FIG. 14 is a three-dimensional isometric view showing the cutting head element connecting with a mower deck.

FIG. 13 shows a base 612 of the cutting head 610 which provides alternative spring pawls 624 located on rotation points 626 to secure the cutting filament 140 within the reliefs 628 which allow the filaments to extend out from the cutting head 610.

IV. Alternative Embodiment Cutting Head System 702

FIGS. 15-23 show another alternative embodiment cutting head system 702, similar to that of the embodiment 602 disclosed above and including several of the same elements thereof. The cutting head system 702 includes a cutting head 710 with a top 716 and bottom 712 portion. Several cutting head apertures 730 are installed between the top 716 and bottom 712 portions of the cutting head 710. Cutting filaments 740 are inserted into a respective aperture 730. To harmonize the illustrations of FIGS. 16 and 17 into the present submitted specification, it is understood that the cutting head apertures 730 are in operation cutting filament receivers each having an elongate and tubular configuration extending outwardly and away from the peripheral wall of the cutting head 710. The cutting head 710 is connected to the rotary drive 10 of a mower deck. The spacer 608 disclosed above is used to ensure proper connection to the rotary drive 10.

Figure 16:
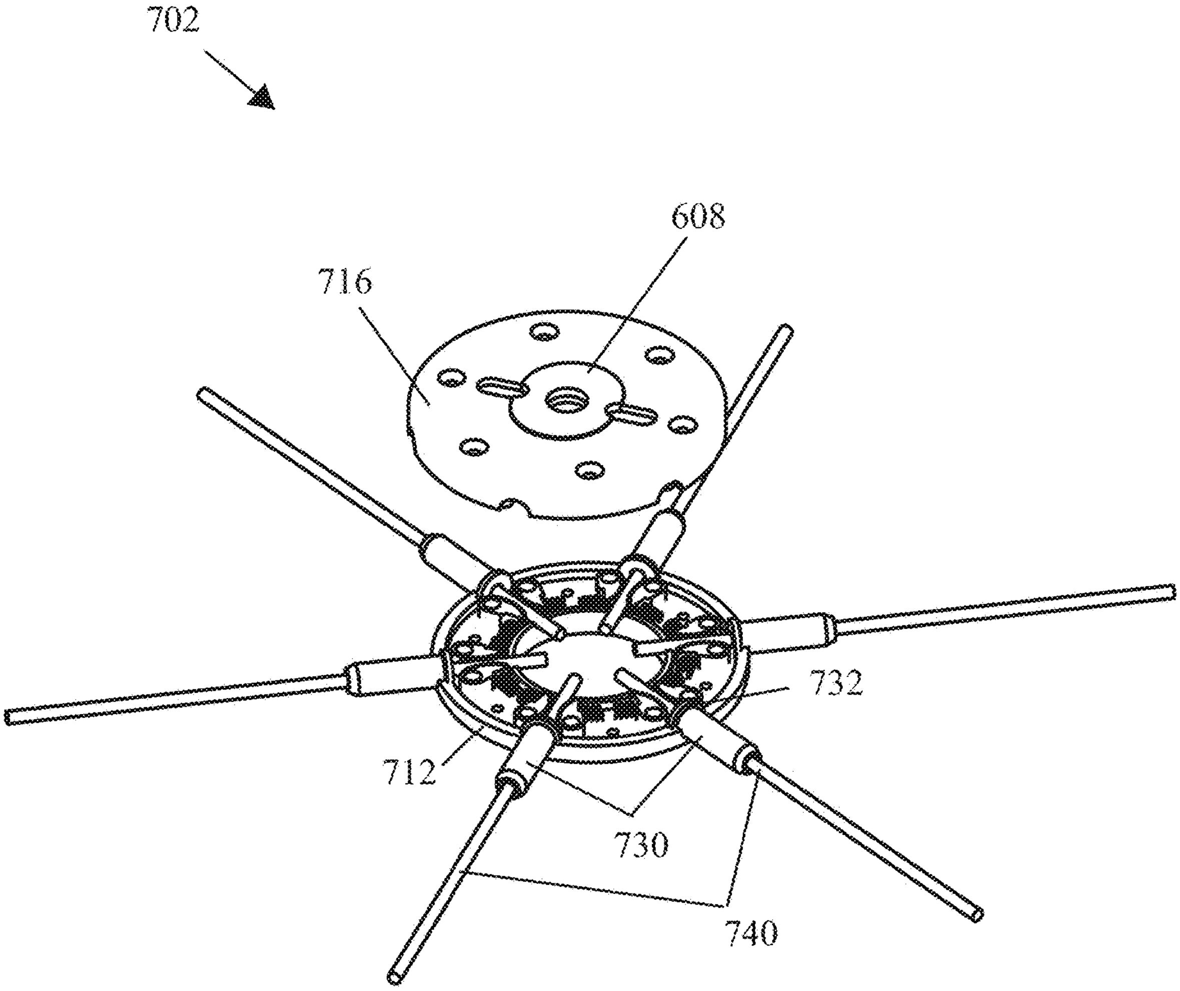
FIG. 16 is a three-dimensional partially exploded isometric view thereof.

FIG. 16 shows how the filaments 740 are retained within the cutting head 710 between the upper 716 and lower 712 portions using a connecter end 732 to retain the aperture within the cutting head.

Figure 17:
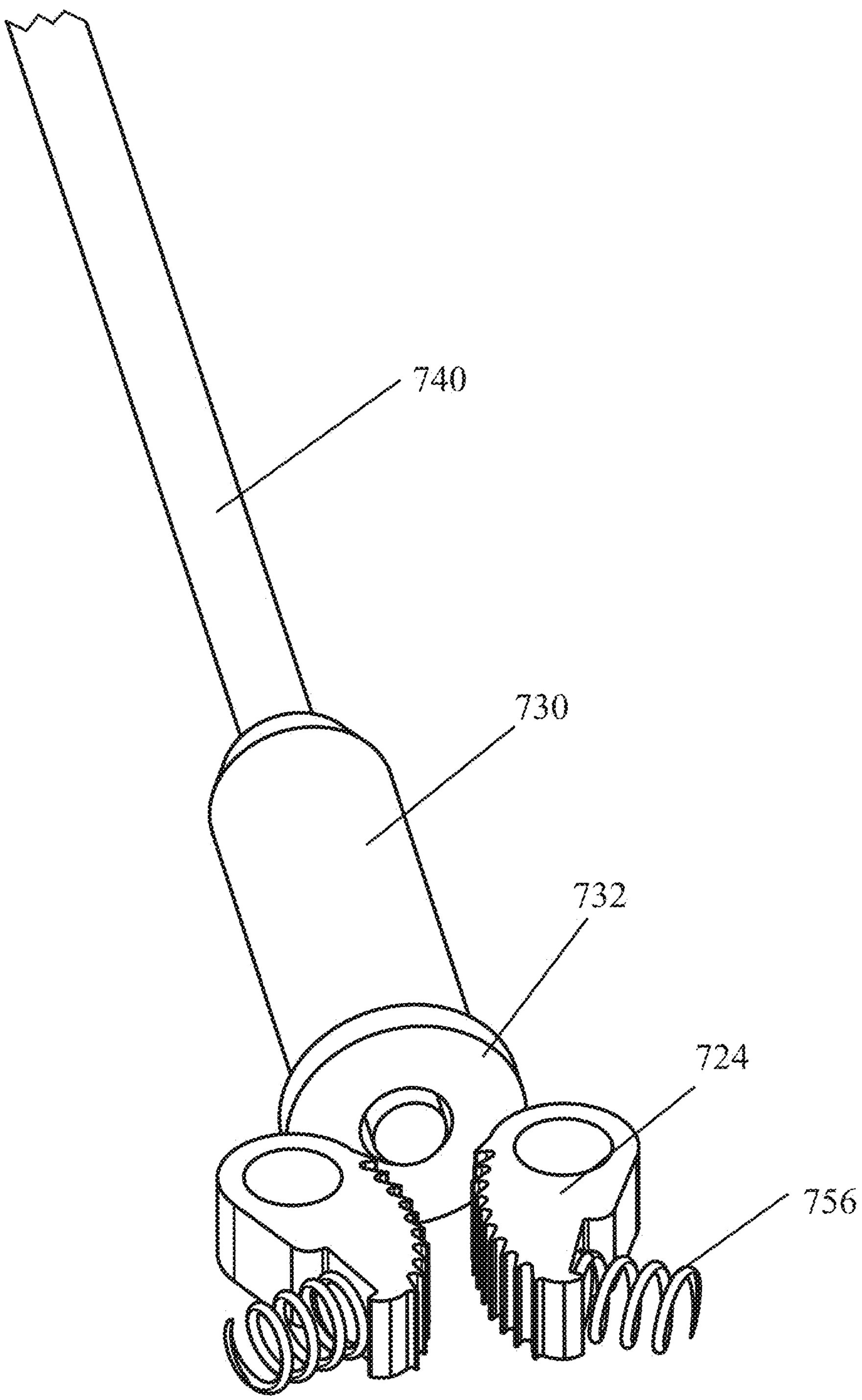
FIG. 17 is a detailed view of a cutting filament element interfacing with spring pawl elements of the embodiment thereof.
Figure 18:
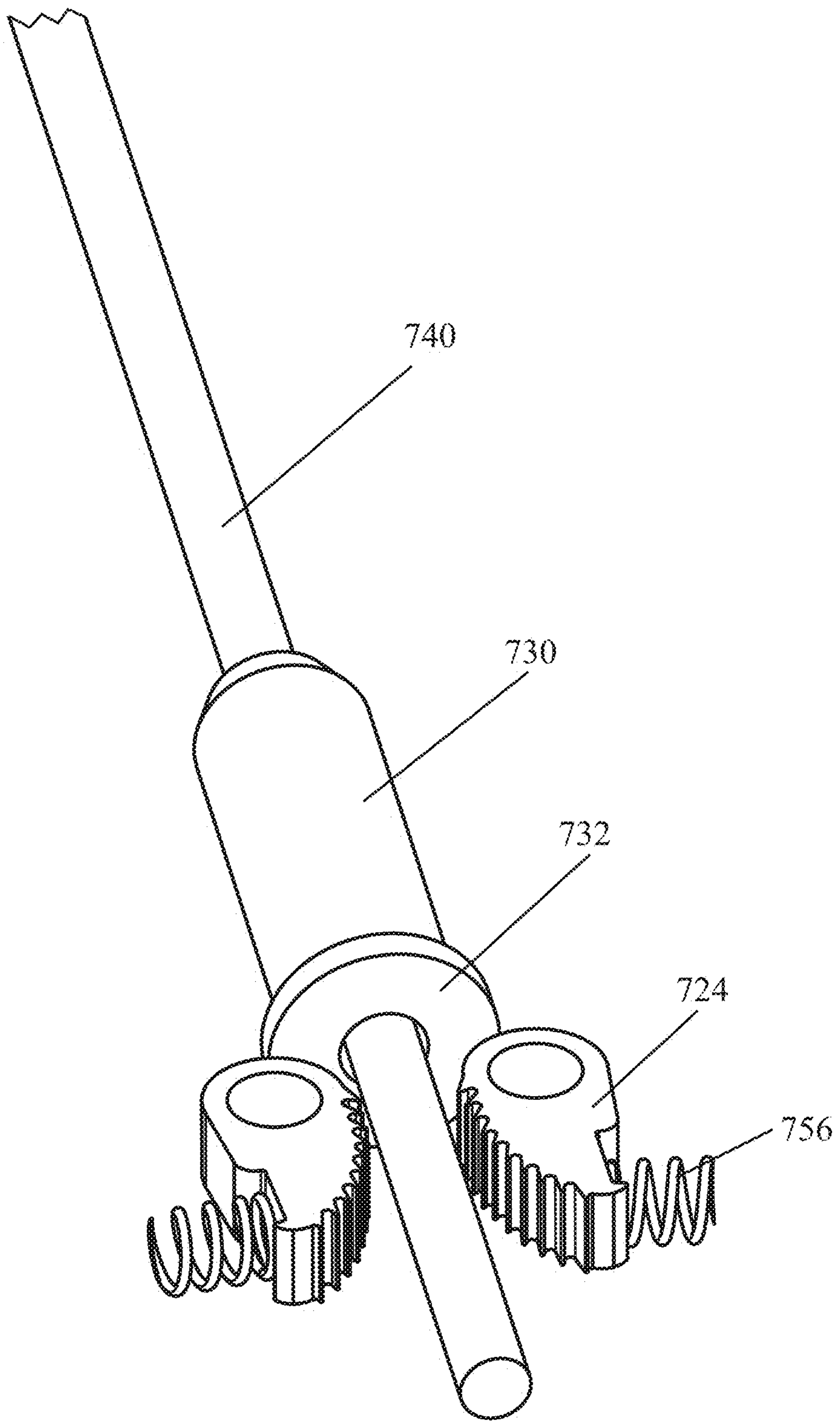
FIG. 18 is another detailed view thereof, showing the cutting filament advanced.

FIGS. 17 and 18 show how the cutting filament 740 is inserted through the aperture 730 and out the end connector 732 into a spring pawl 724 with spring 756 for gripping and retaining the filament 740 within the cutting head.

Figure 19:
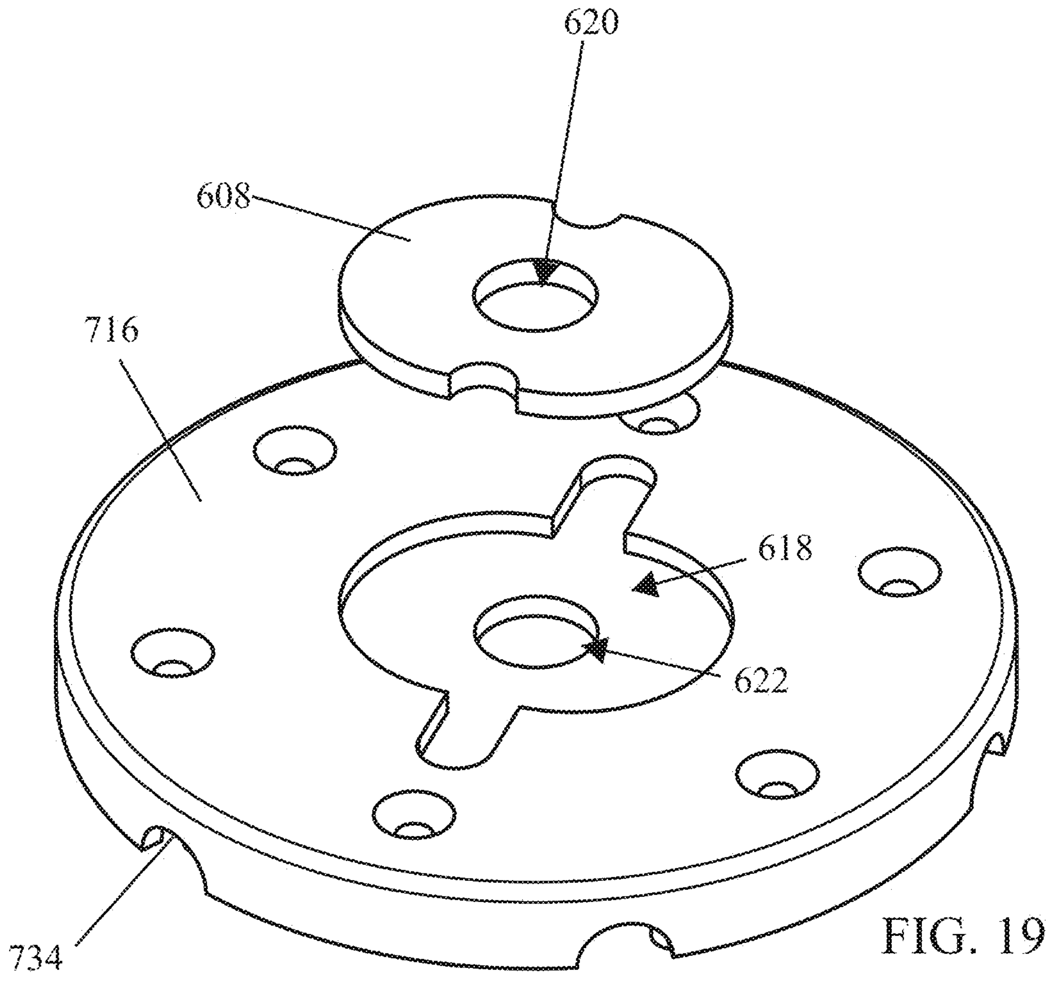
FIG. 19 is a partially exploded three-dimensional isometric view of the alternative embodiment of FIG. 15 with the spacer element of FIG. 8.

FIG. 19 shows one embodiment of a top portion 716 of the cutting head with the spacer 608 of FIG. 8 including a receiver 620 for receiving one type of rotary drive 10. Aperture receivers 734 receive the apertures as shown above.

Figure 9:
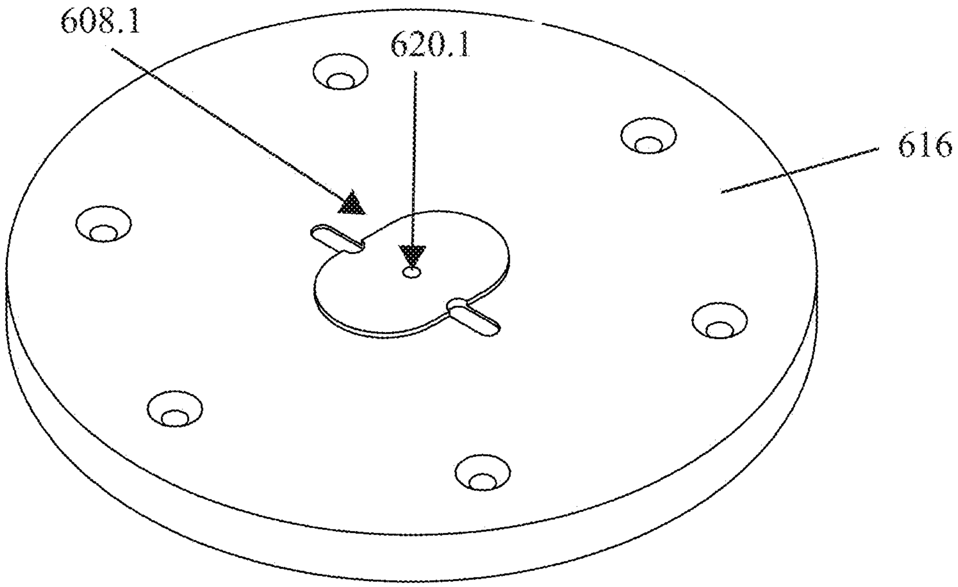
FIG. 9 is a three-dimensional isometric view with an alternative embodiment spacer element.
Figure 10:
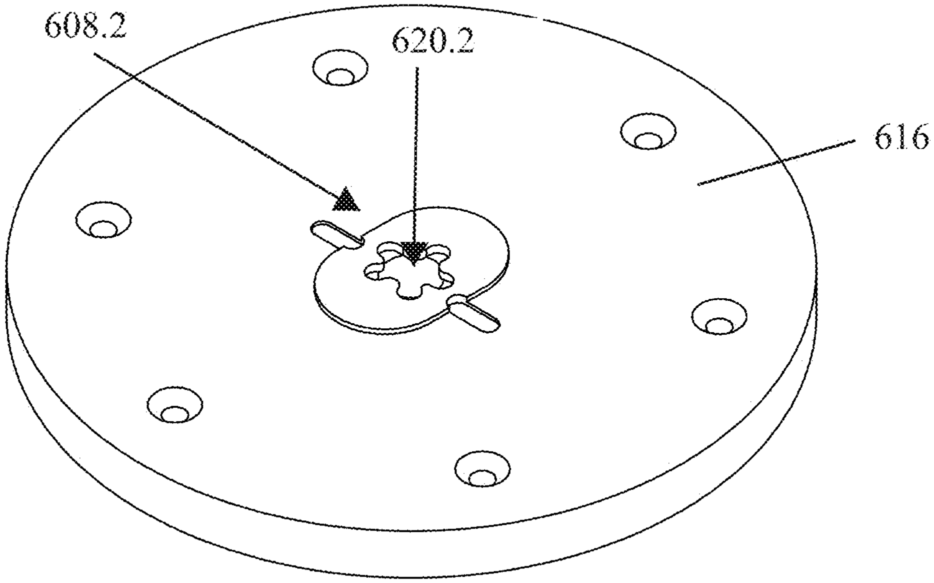
FIG. 10 is a three-dimensional isometric view with another alternative embodiment spacer element.
Figure 11:
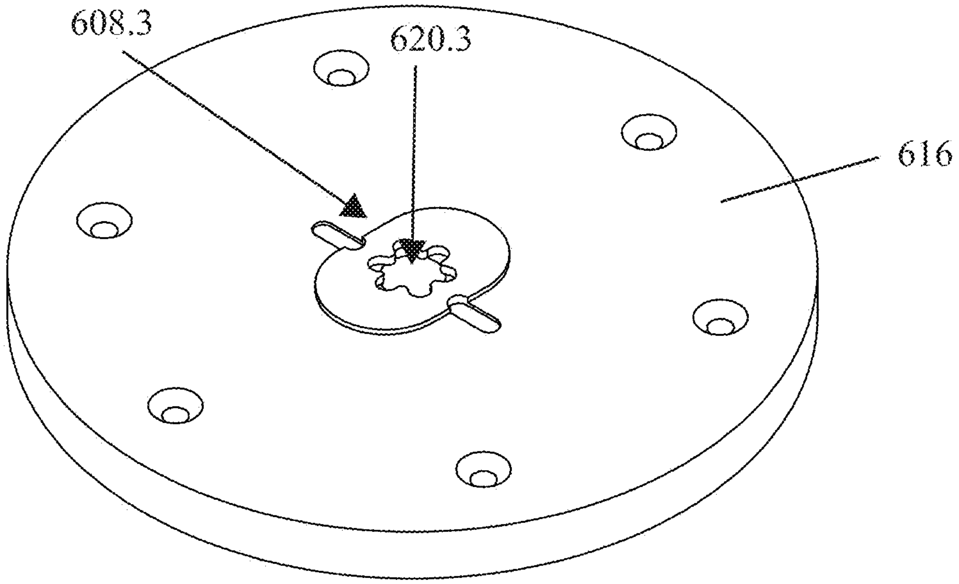
FIG. 11 is a three-dimensional isometric view with another alternative embodiment spacer element.
Figure 12:
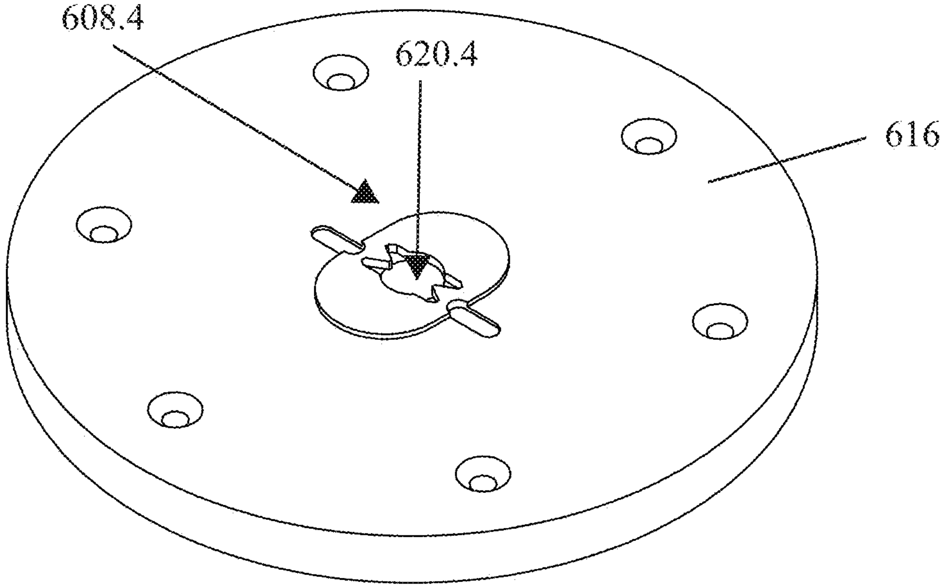
FIG. 12 is a three-dimensional isometric view with another alternative embodiment spacer element.
Figure 20:
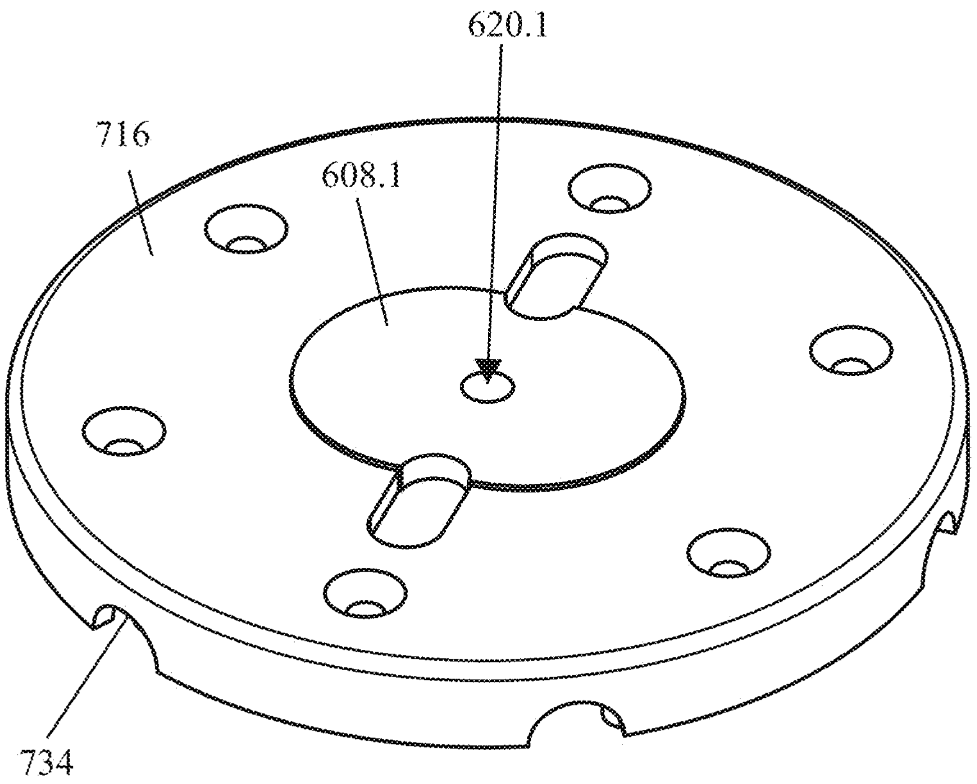
FIG. 20 is a three-dimensional isometric view of the embodiment of FIG. 15 with the spacer element of FIG. 9.
Figure 21:
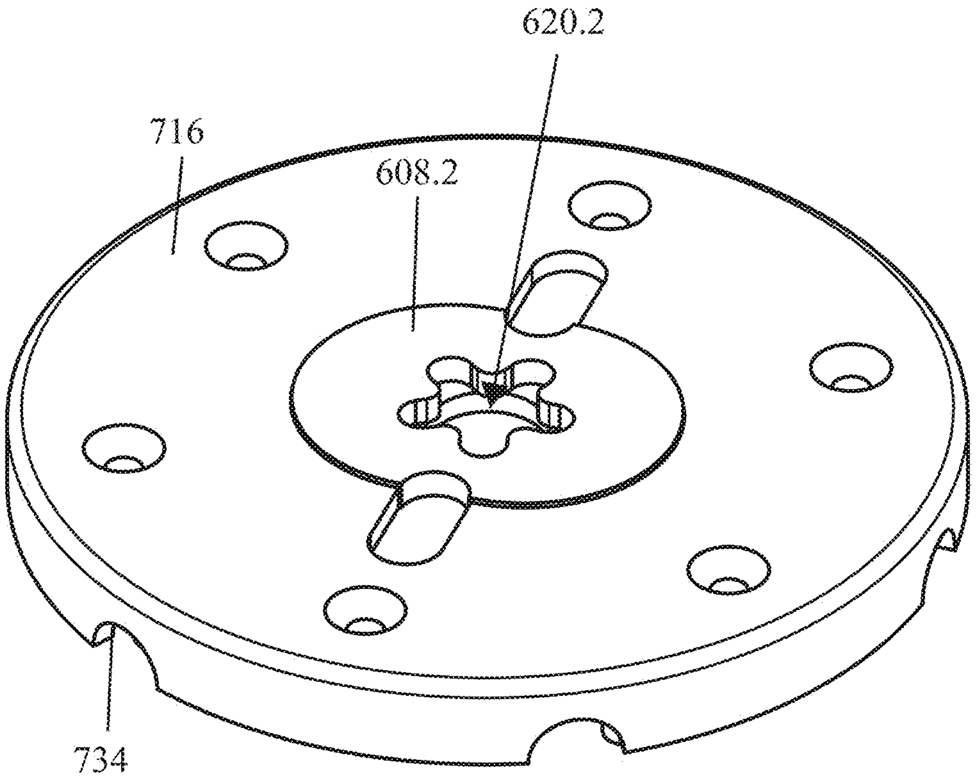
FIG. 21 is a three-dimensional isometric view of the embodiment of FIG. 15 with the spacer element of FIG. 10.
Figure 22:
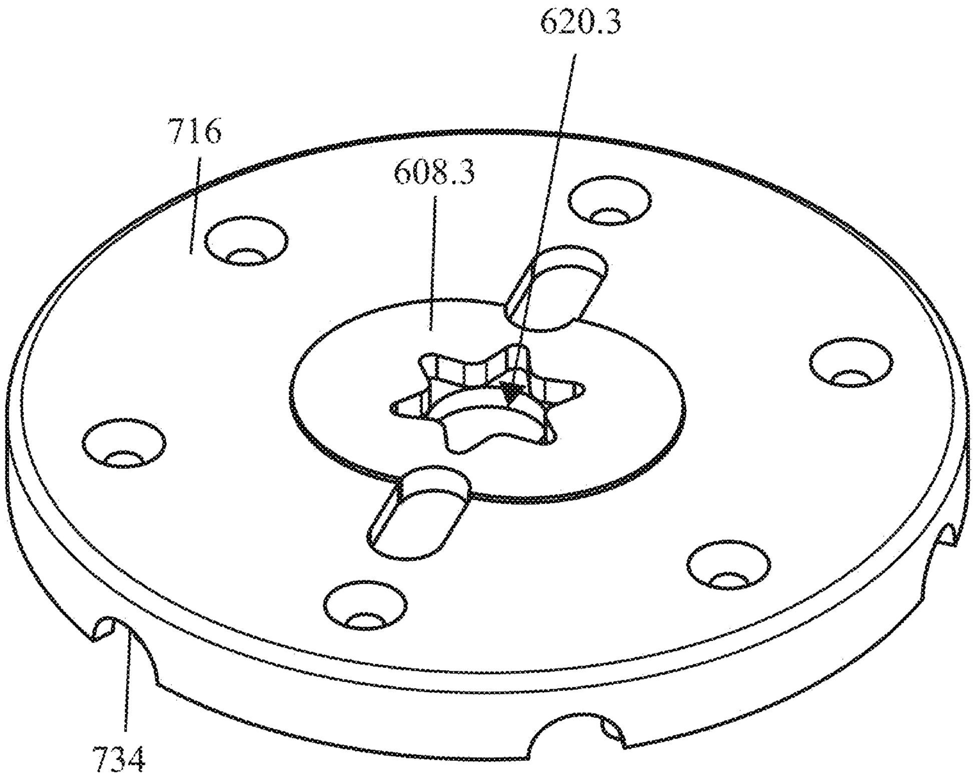
FIG. 22 is a three-dimensional isometric view of the embodiment of FIG. 15 with the spacer element of FIG. 11.
Figure 23:
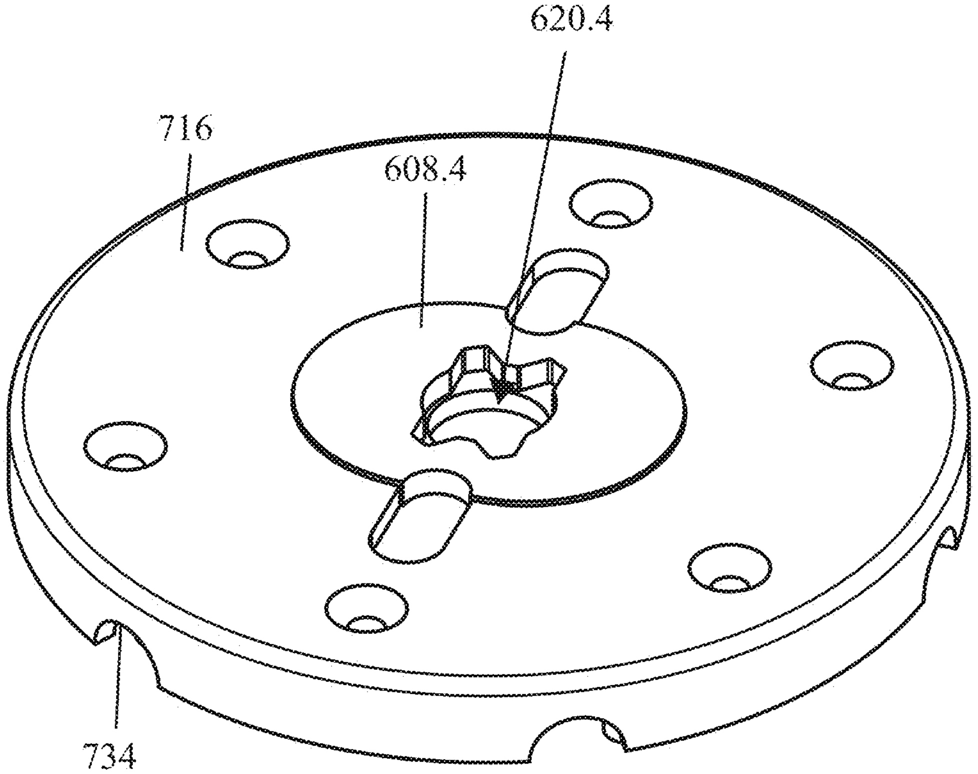
FIG. 23 is a three-dimensional isometric view of the embodiment of FIG. 15 with the spacer element of FIG. 12.

Similarly, FIG. 20 shows the spacer 608.1 of FIG. 9, including receiver 620.1. FIG. 21 shows the spacer 608.2 of FIG. 10, including receiver 620.2. FIG. 22 shows the spacer 608.3 of FIG. 11, including receiver 620.3. FIG. 23 shows the spacer 608.4 of FIG. 12, including receiver 620.4.

Figure 24:
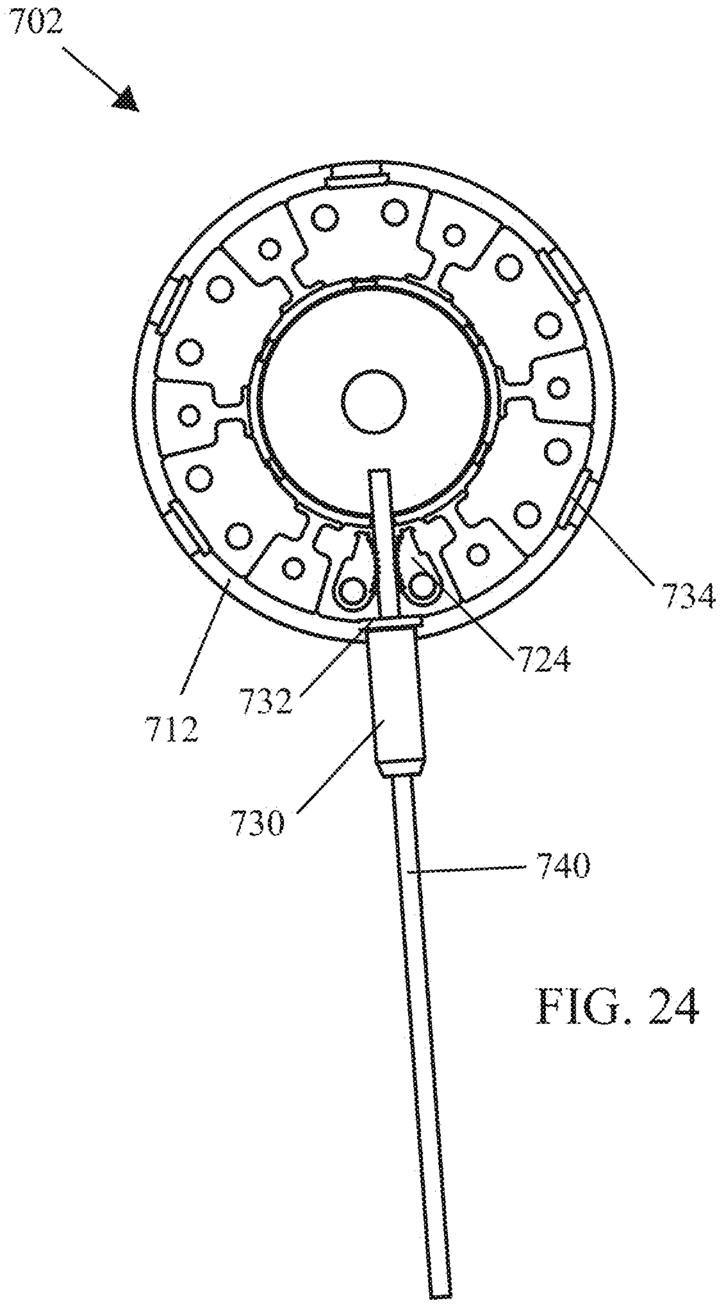
FIG. 24 is a top plan view of the bottom casing element of the embodiment of FIG. 15.

FIG. 24 is a top plan view showing the aperture 730 received within the bottom portion 712 of the cutting head retaining the aperture 730 connector 732 within the housing itself. The cutting filament 740 is inserted through the aperture and received by the spring pawls 724.

Figure 15:
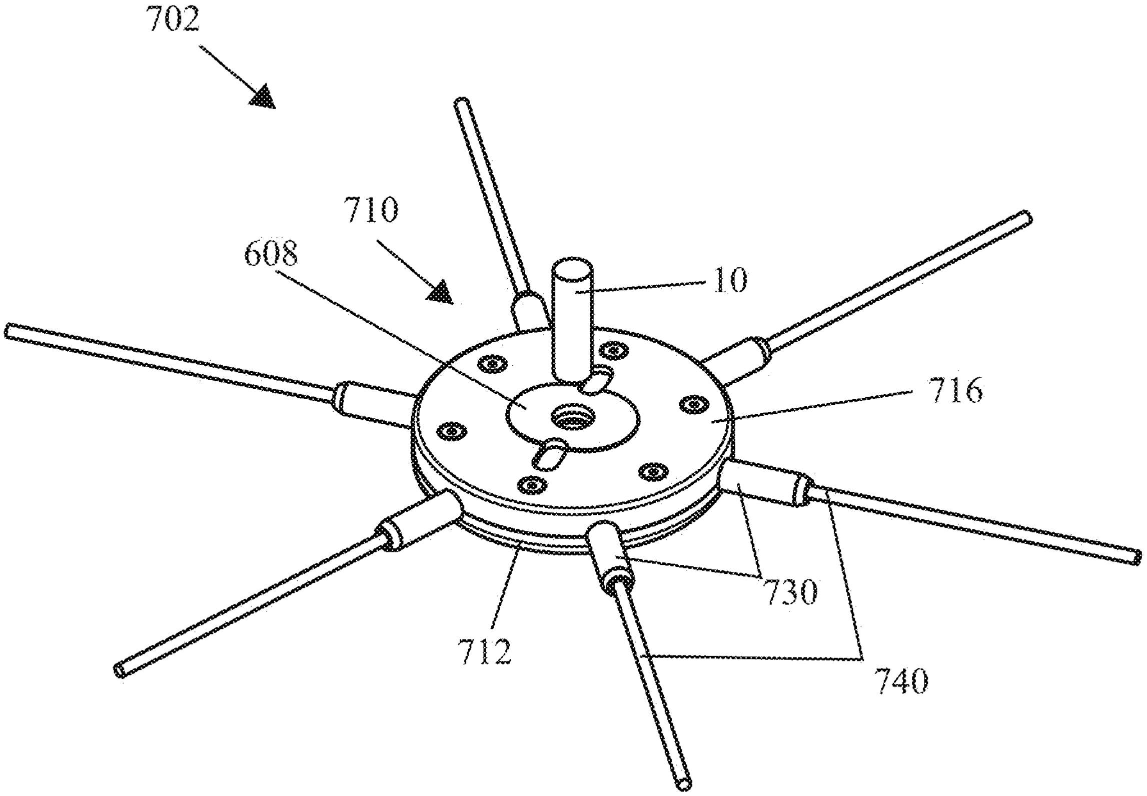
FIG. 15 is a three-dimensional isometric view of an alternative embodiment cutting head element connecting to a rotary drive element of a mower deck environment.
Figure 25:
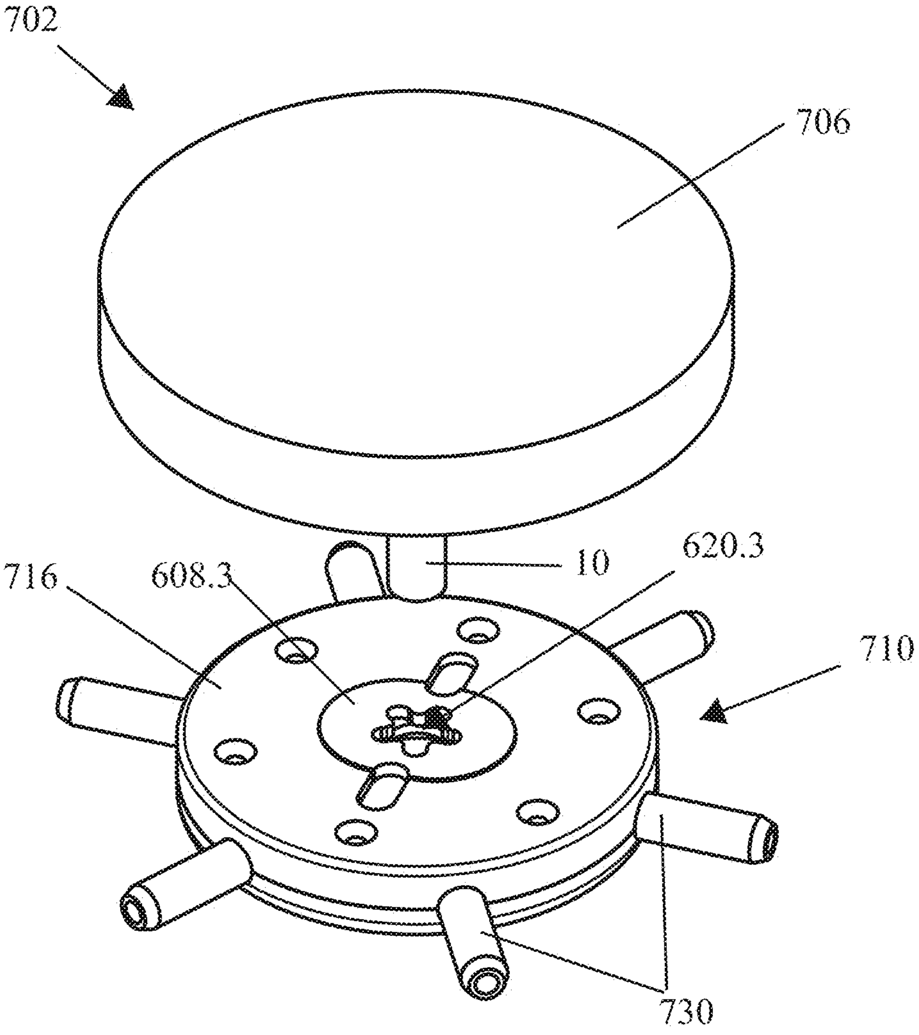
FIG. 25 is a three-dimensional isometric view of the embodiment of FIG. 15 shown assembled without cutting filament elements installed therein.

FIG. 25, like FIG. 15, shows the assembly of the cutting head 710 with the apertures 730 installed and connecting to the rotary drive 10 of a mower 706.

V. Alternative Embodiment Cutting Head System 802 with Three-Tooth Cam 852

Figure 26:
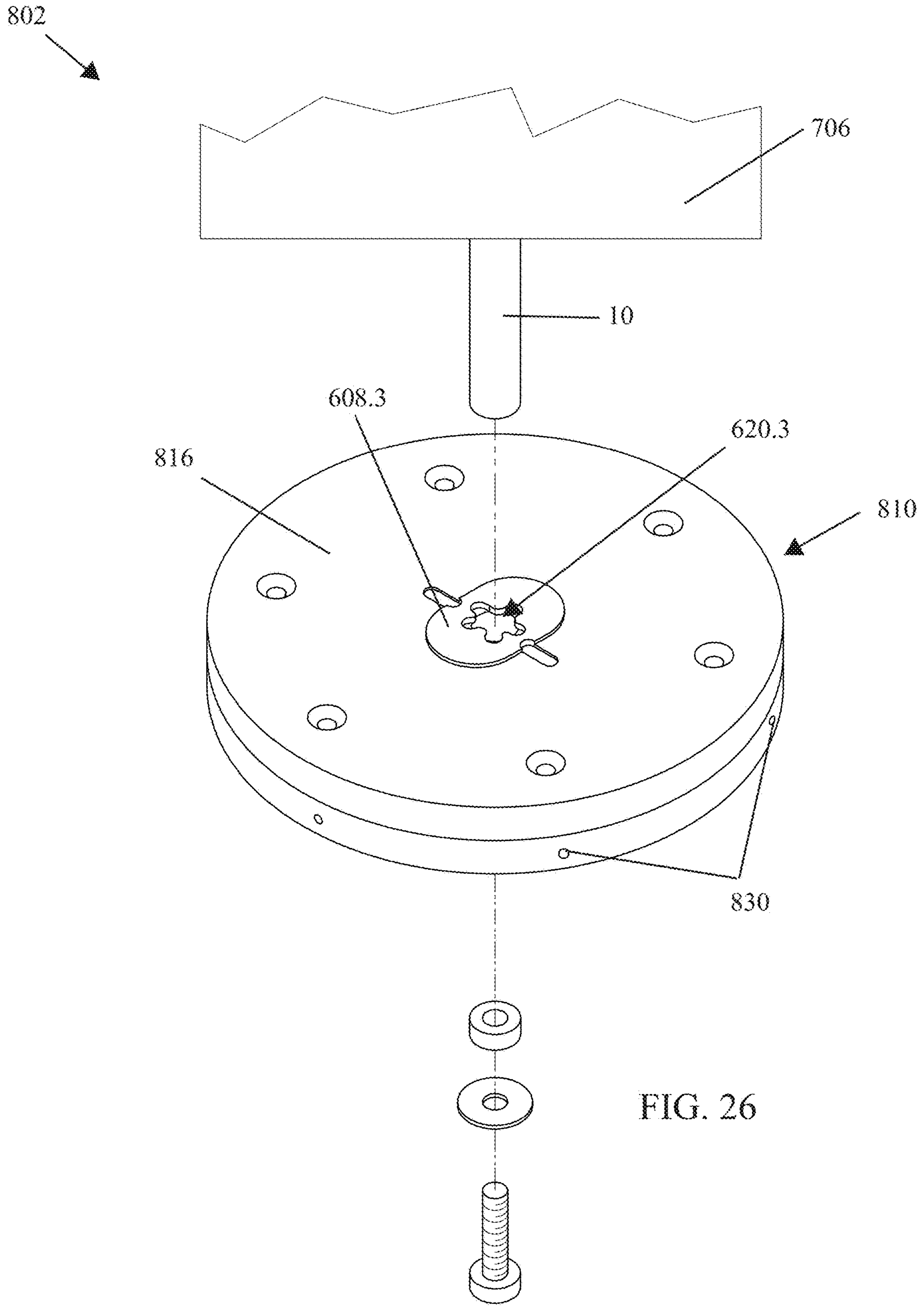
FIG. 26 is a three-dimensional isometric view of a slightly alternative embodiment thereof.
Figure 27:
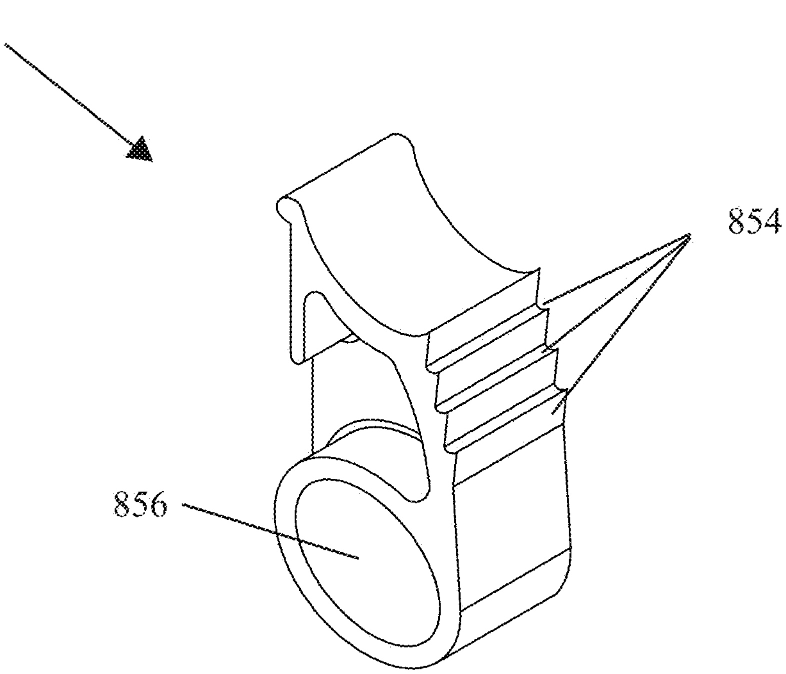
FIG. 27 is a three-dimensional isometric view of a three-tooth cam element thereof.
Figure 28:
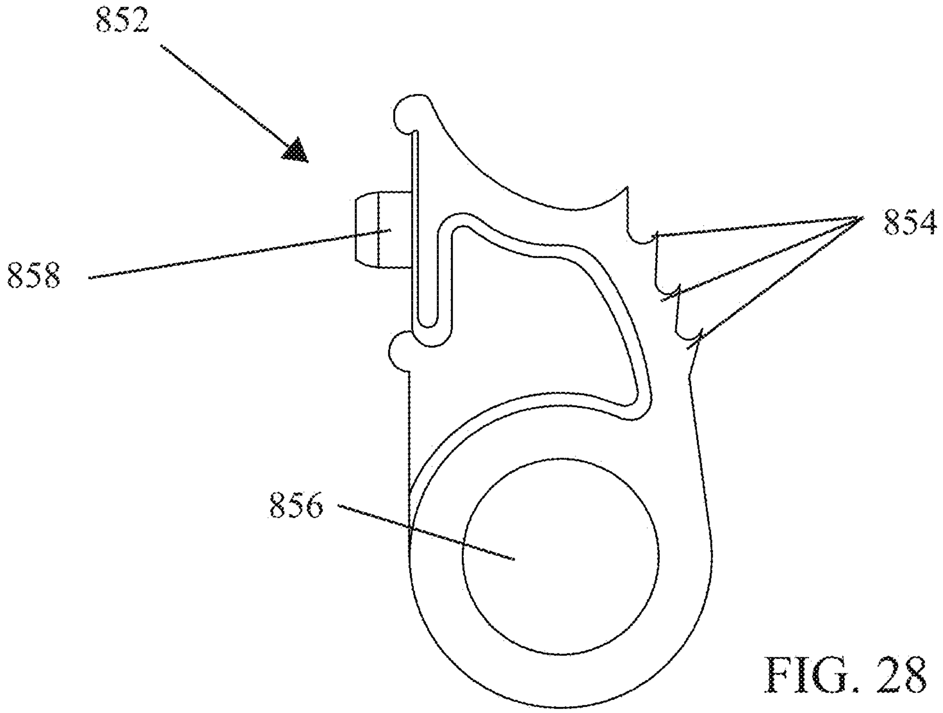
FIG. 28 is a side elevational view thereof.
Figure 29:
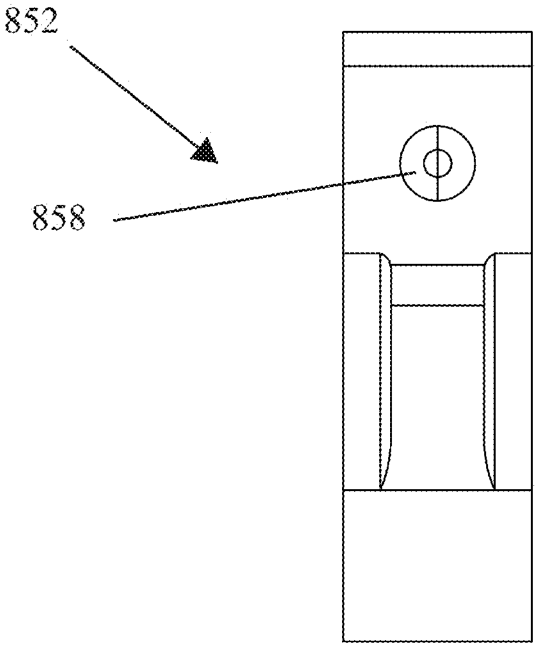
FIG. 29 is a front elevational view thereof.
Figure 30:
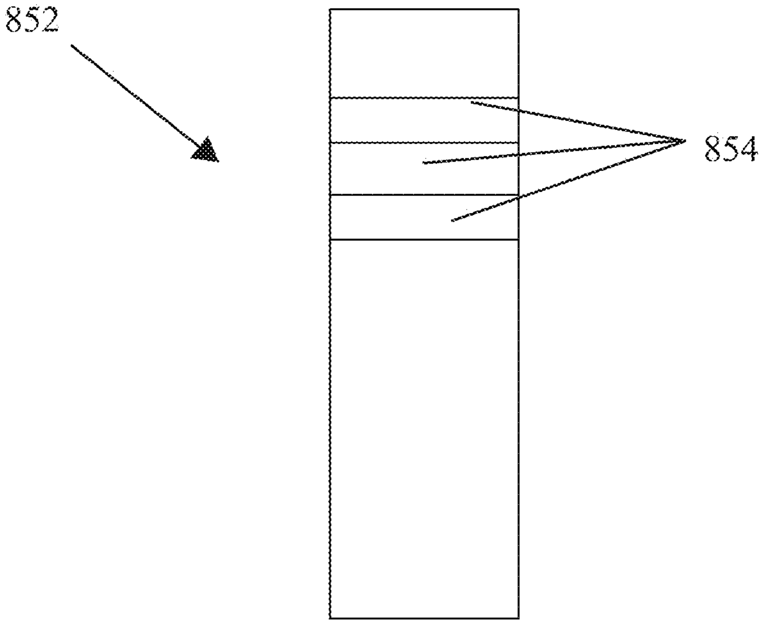
FIG. 30 is a rear elevational view thereof.

FIG. 26, like FIG. 25, shows the assembly of a cutting head 810 with the apertures 830 appearing as no more than small holes on the side of the cutting head 810 assembly formed by the top 816 and bottom 812 halves. Here, shown with alternative receiver spacer 608.3 with shape 620.3 as an example, the spacer is inserted into the relief of the top 816 half of the cutting head 810 and is again shown connecting to the rotary drive 10 of a mower 706. On the bottom, connecting the two halves 812, 816 of the cutting head 810 to the rotary drive 10 is shown a mounting bolt 836 passing through a washer 834 and bushing. The bushing decreases the hole size, thus allowing the cutting head assembly 810 to even be used on push mowers.

Figure 31:
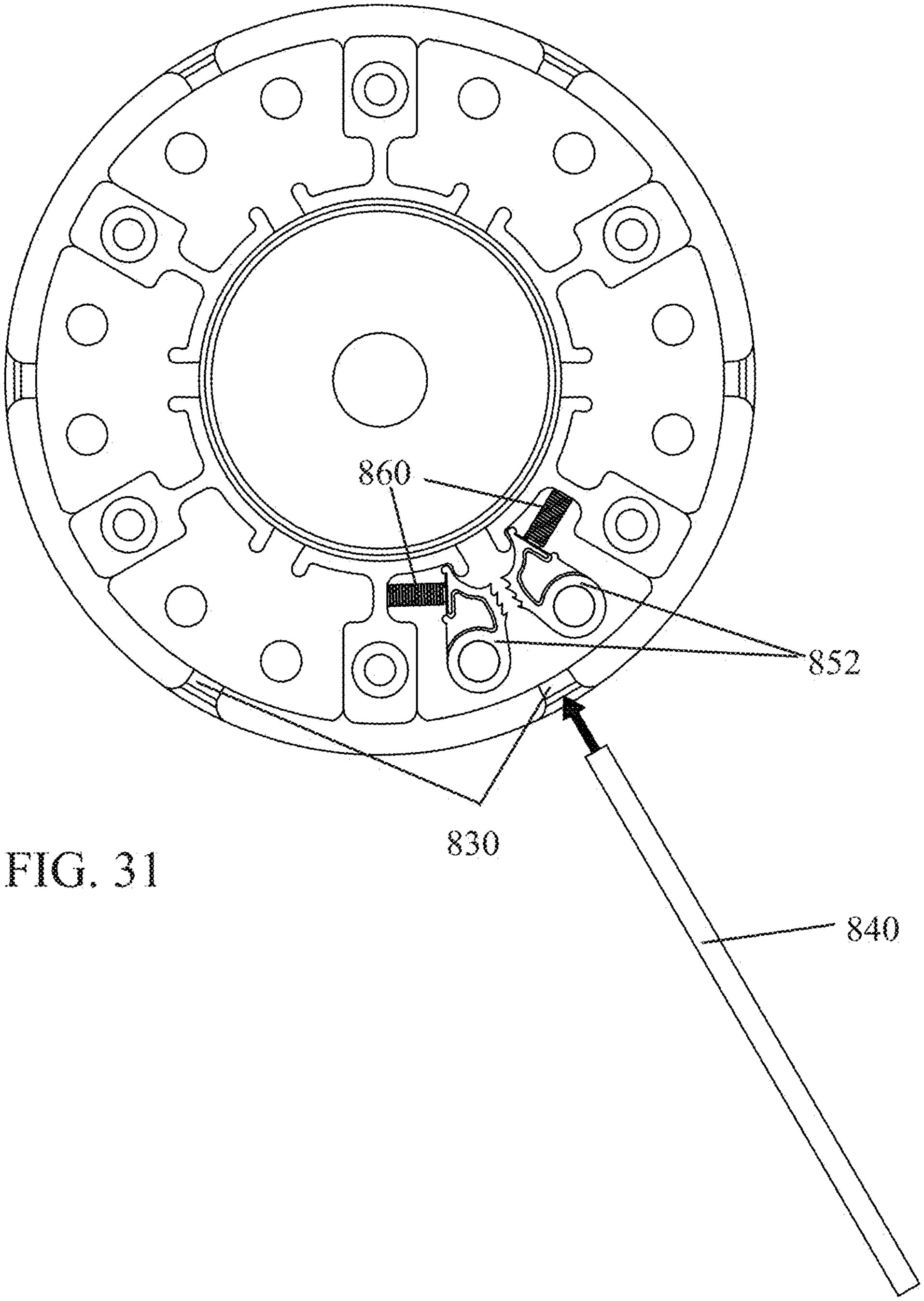
FIG. 31 is a top plan view of an alternative bottom enclosure of the cutting head element of the present invention with a filament in a first position.
Figure 32:
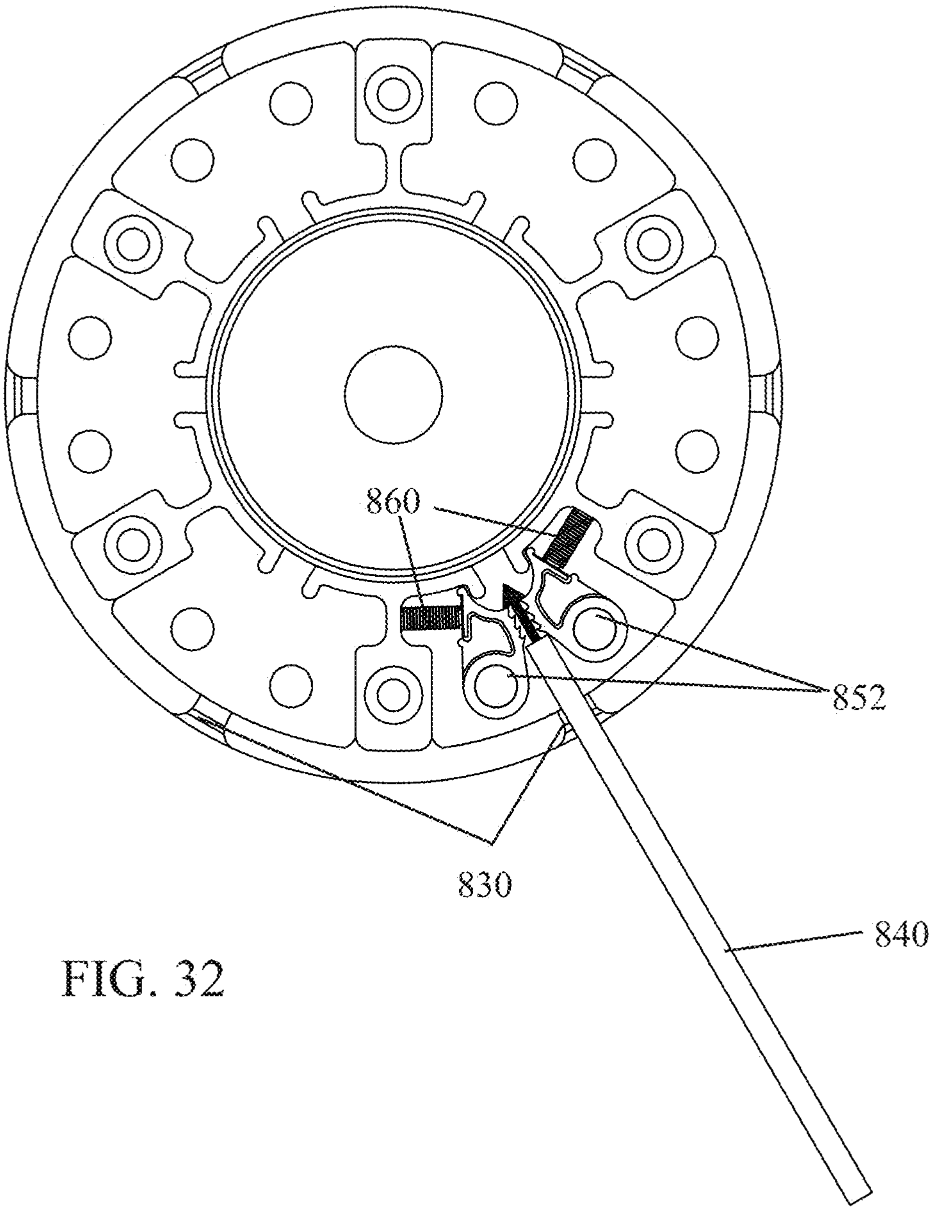
FIG. 32 is a top plan view thereof with the filament thereof in a second position.
Figure 33:
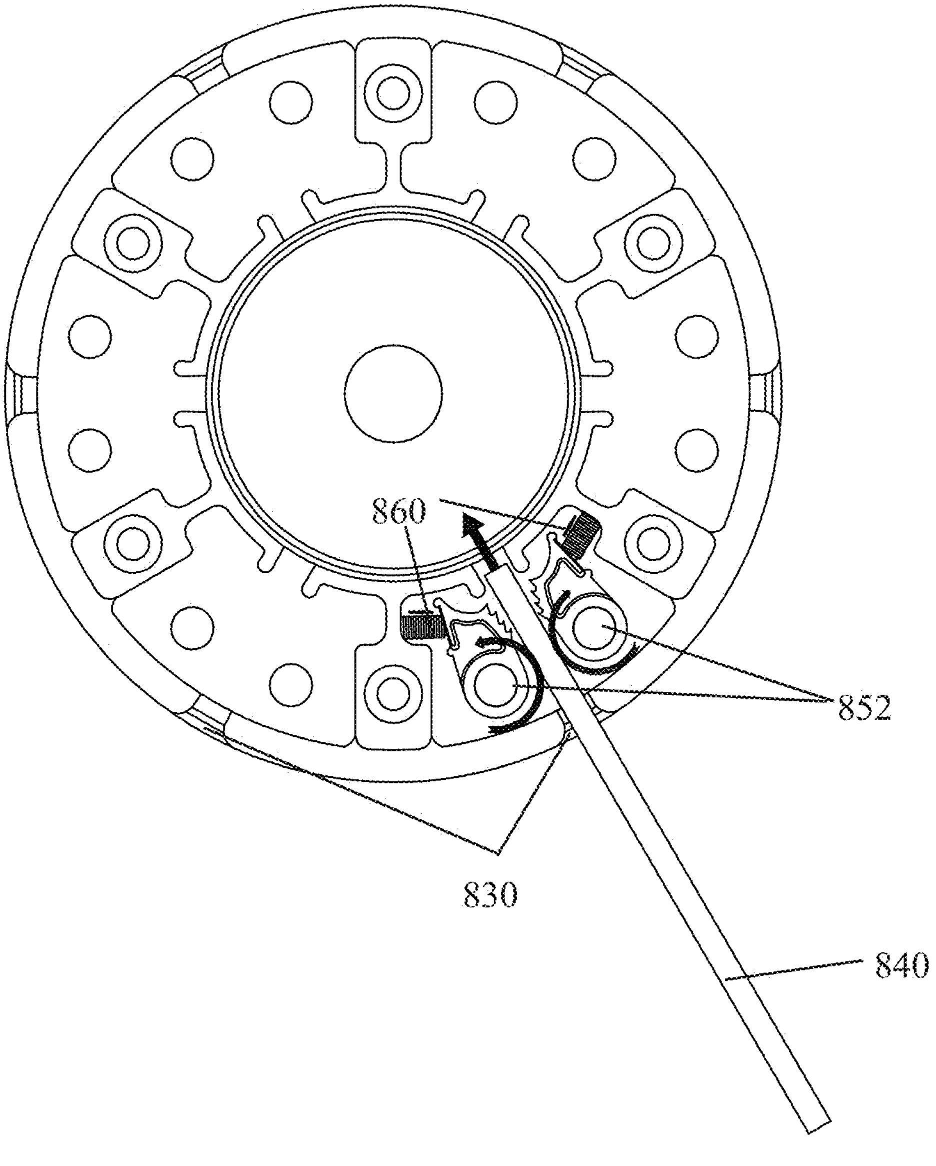
FIG. 33 is a top plan view thereof with the filament thereof in a third position.
Figure 34:
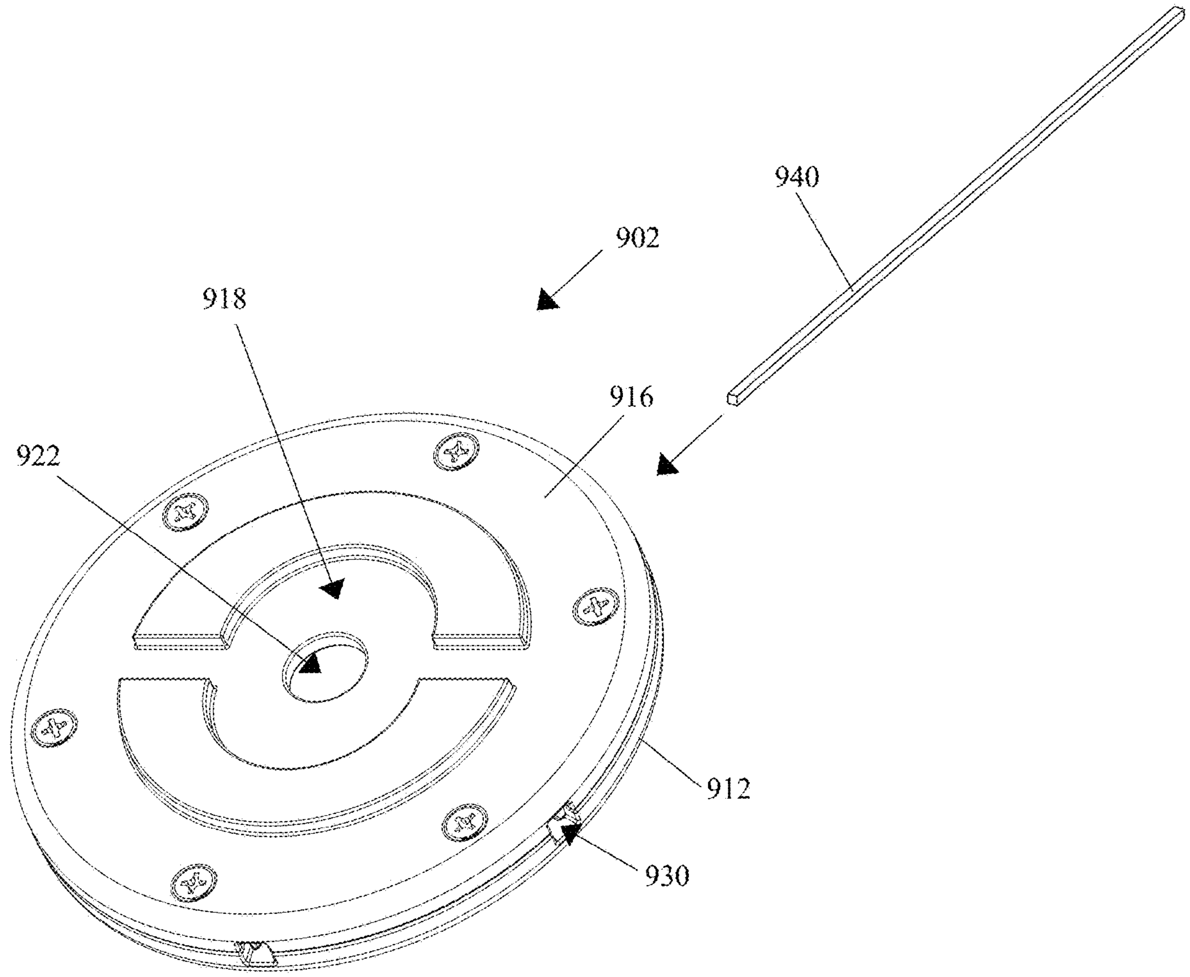
FIG. 34 is a three-dimensional isometric view of yet another alternative embodiment of the present invention showing a cutting filament being inserted therein.

FIGS. 27-30 show a three-toothed cam 852. The main feature are the three teeth 854 on the rear face of the cam and the fulcrum cylinder 856 around which the cam 852 spins when pushed. A spring receiver 858 connects to springs 860 which are placed within the bottom plate 812 of the cutting head 810. As shown in FIGS. 31-33, the apertures 830 allow a stick-shaped filament 840 to be pushed through the aperture, through the teeth 854 of the cams, thereby pushing against the springs 860 and eventually locking the filament in place between the cams 852 due to the spring 860 forces. The spinning force of the cutting head will not dislodge the filament 840 from the cams 852. However, when worn down, the user can simply pull on the remaining end of the filament 840 and it will easily be removed, returning the cams 852 to their original positions shown in FIG. 31 due to the spring 860 forces.

The cutting head 710 could be manufactured using 3D printing technology using a nylon material. This would allow use with smaller electric lawn mowing machines wherein the lighter weight material would increase the battery life and enhance the usability of the electric lawn mowing machine. The nylon material is structurally sound enough to remain in place in such an embodiment.

Vi. Alternative Embodiment Cutting Head System 902 With Single Cam 952 Action As shown in FIGS. 34-41, the present invention provides another alternative embodiment cutting head system 902, similar to that of the prior embodiments disclosed above and including several of the same elements thereof. The cutting head system 902 includes a cutting head with a top 916 and bottom 912 portion. Several cutting head apertures 930 are installed between the top 916 and bottom 912 portions of the cutting head. Cutting filaments 940 are inserted into a respective aperture 930. The cutting head is designed to be connected to the rotary drive 10 of a mower deck just as the previous embodiments. A spacer, such as spacer 608 disclosed above, is used to ensure proper connection to the rotary drive 10 within the relief 918 on the top portion 916 of the cutting head. The filament is shown as having a square cross-section, but any suitably shaped filament may be used.

As shown in FIGS. 35A-38, unlike the previous embodiments and all known similar products on the market, this example embodiment of the present invention relies on only a single cam 952 for each of the filaments 940. This is an improvement over prior embodiments as it reduces the number of cams which are needed by half and it allows for a weaker spring to be used. Each cam 952 has a spring 960, which is lighter and therefore easier to manipulate than the prior embodiments. The spring 960 is situated between a cam receiver slot 962 within the cam 952 itself, and a spring housing 964 which has a housing receiver slot 966 mirroring the cam receiver slot 962. The cam 952 rotates about its fulcrum cylinder 956 as the filament is pushed into and past the cam 952, which grips the filament by its teeth 954, causing the cam to thereby rotate, depressing the spring 960 between the two receiver slots 962, 966. The spring is not strong enough to push the cam and filament outward, and thus remains depressed until the filament is physically removed, which then allows the spring 960 to press the cam 952 back into its original position.

As designed, this cutting head system 902 is capable of connecting to the rotary drive 10 of any lawn mowing or vegetation cutting machine, from hand-held weed trimmers to large commercial grade equipment. The use of the single cam 952 provides increased balance against centripetal force and provides a superior grip about the filament 940 from prior embodiments. Because there is only a single cam 952 for each filament 940, the design can incorporate the rotation of the cutting head to ensure the cam provides superior grip against the filament while using a lighter spring 960 which is easier to insert than in previous embodiments.

Figure 35A:
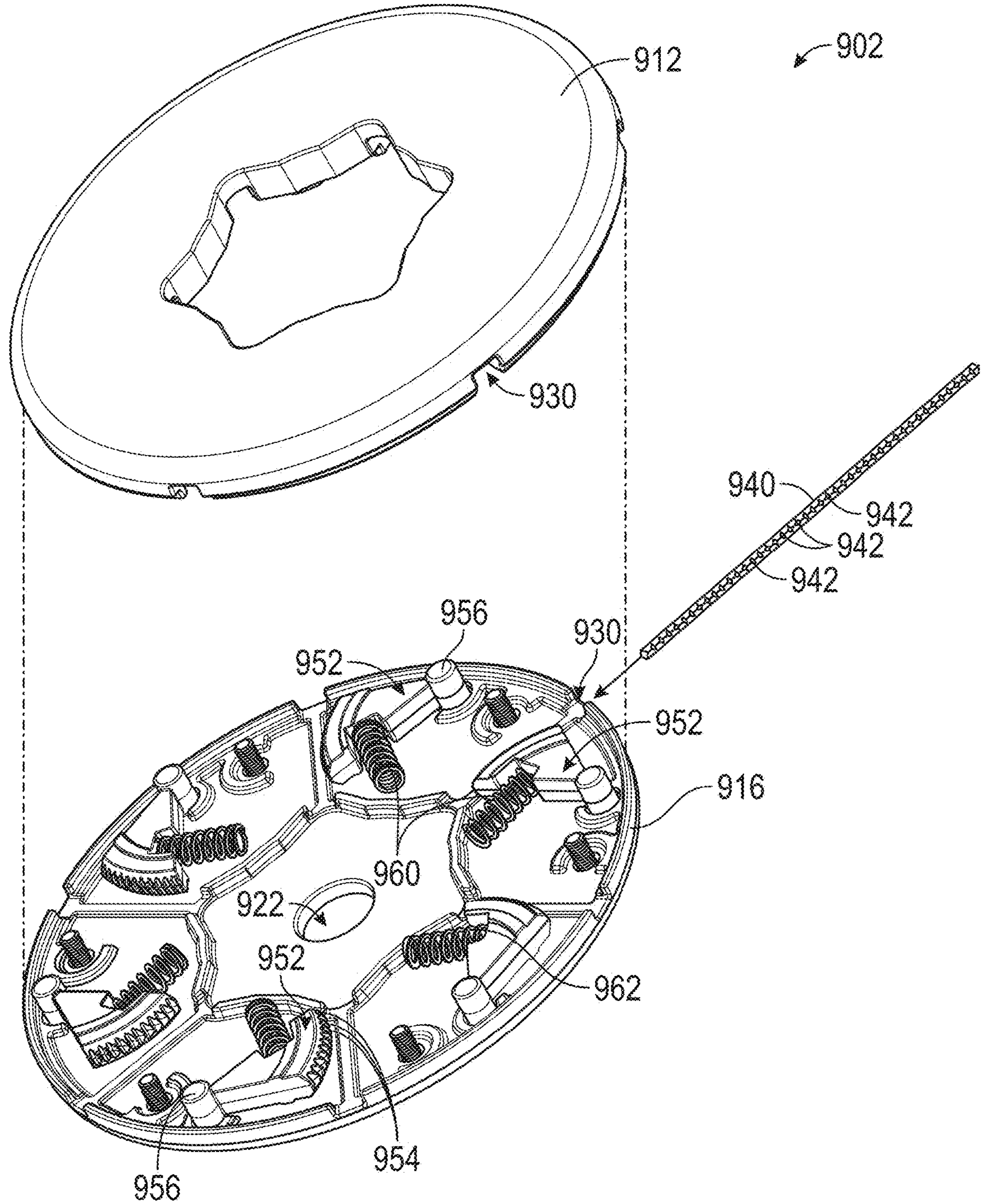
FIG. 35A is a partially-exploded three-dimensional isometric view from the bottom of the embodiment thereof, showing internal components within a top portion thereof.
Figure 35B:
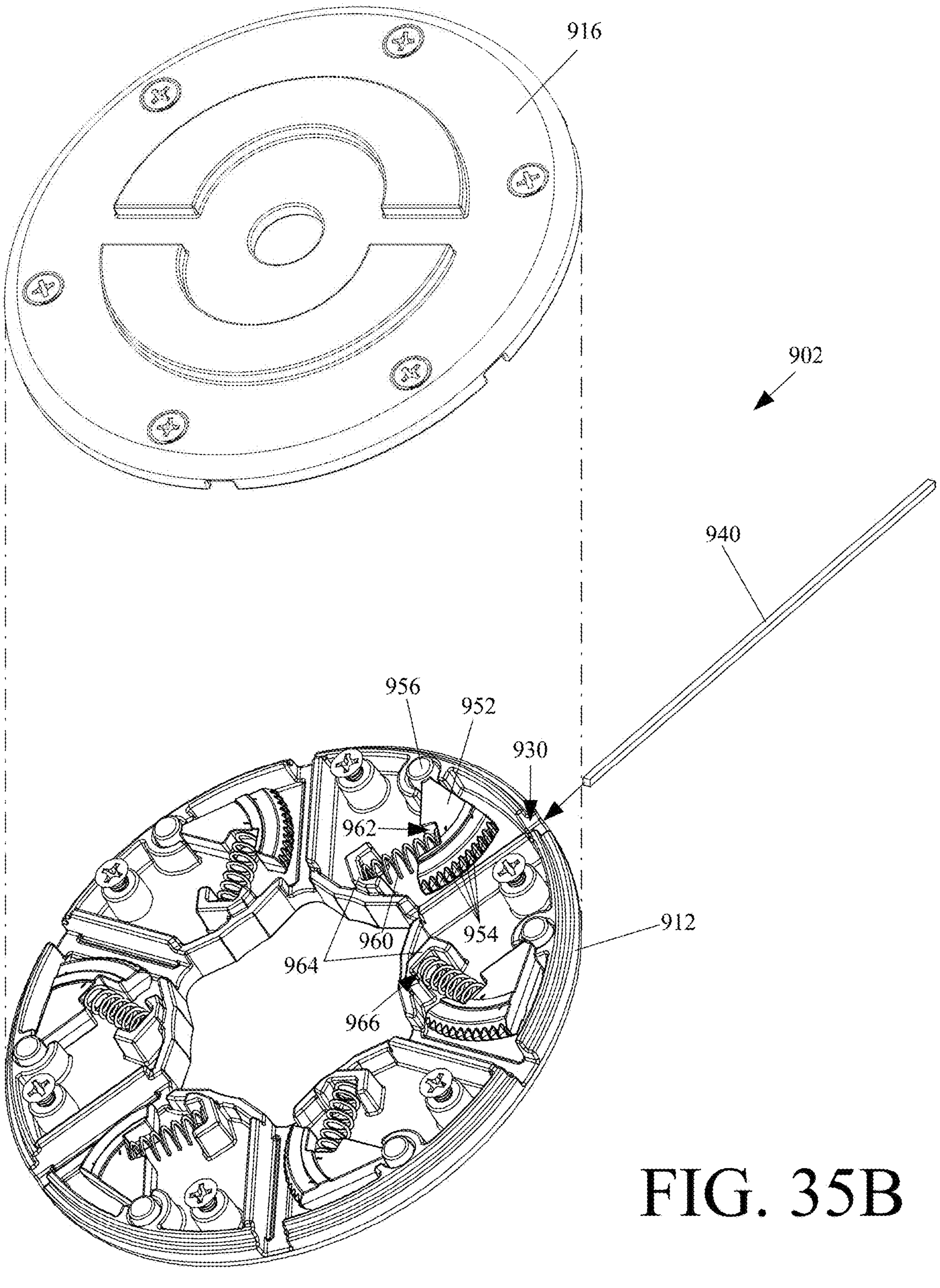
FIG. 35B is a partially-exploded three-dimensional isometric view from the top of the embodiment thereof, showing internal components within a bottom portion thereof.
Figure 36:
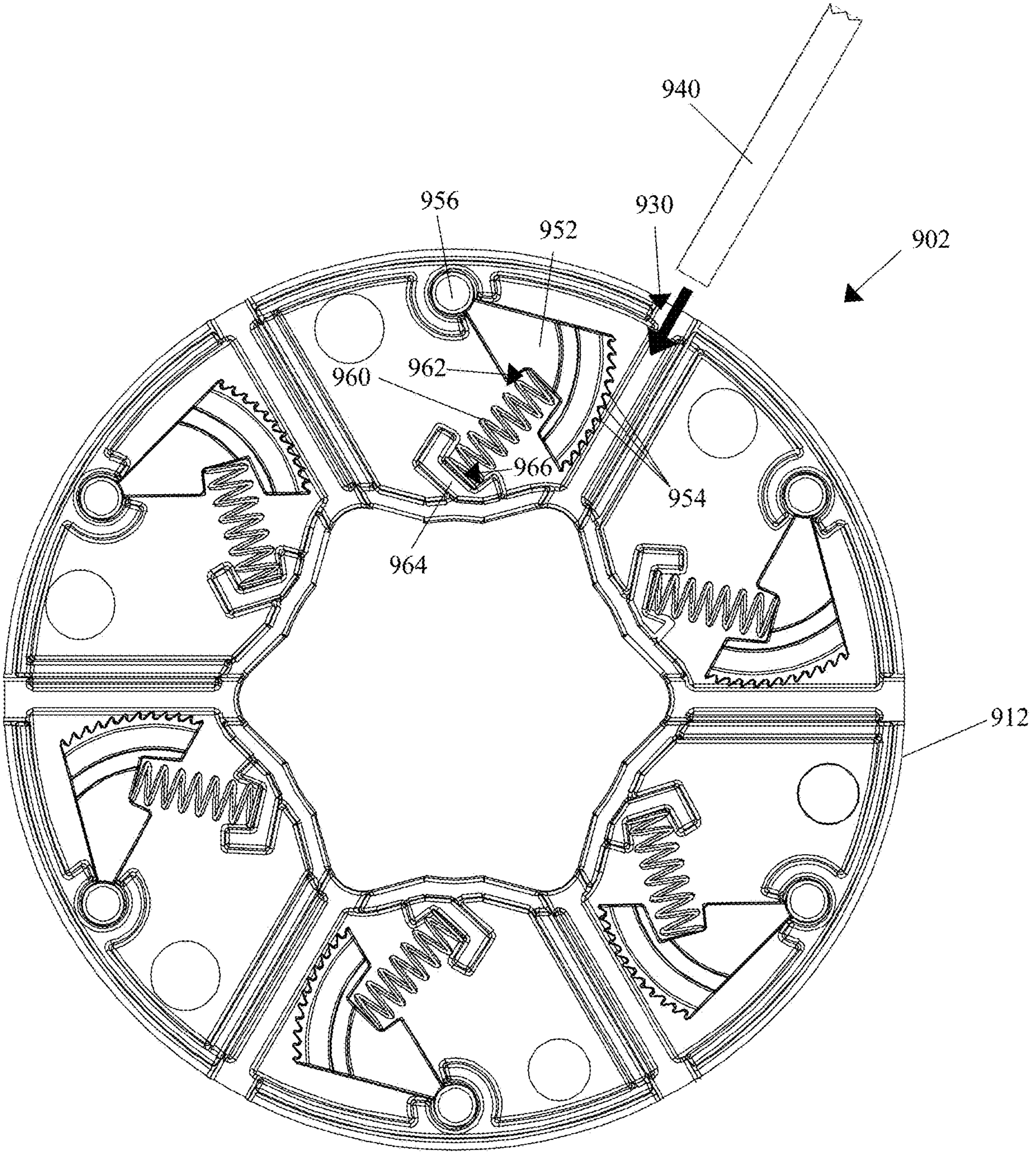
FIG. 36 is a top plan view thereof with the top portion removed, showing the filament element being inserted therein.
Figure 37:
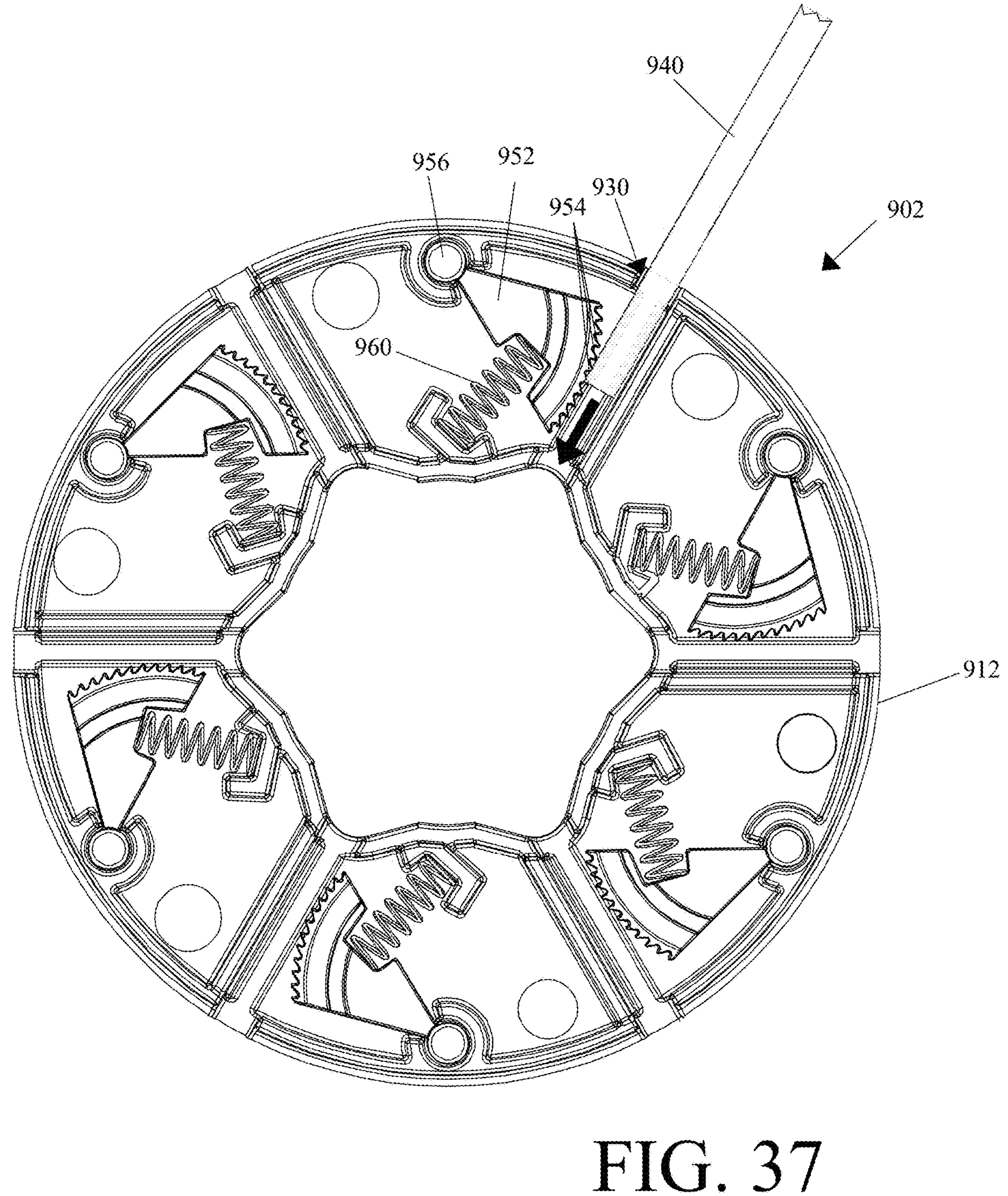
FIG. 37 is a top plan view thereof with the top portion removed, showing the filament element partially inserted therein.
Figure 38:
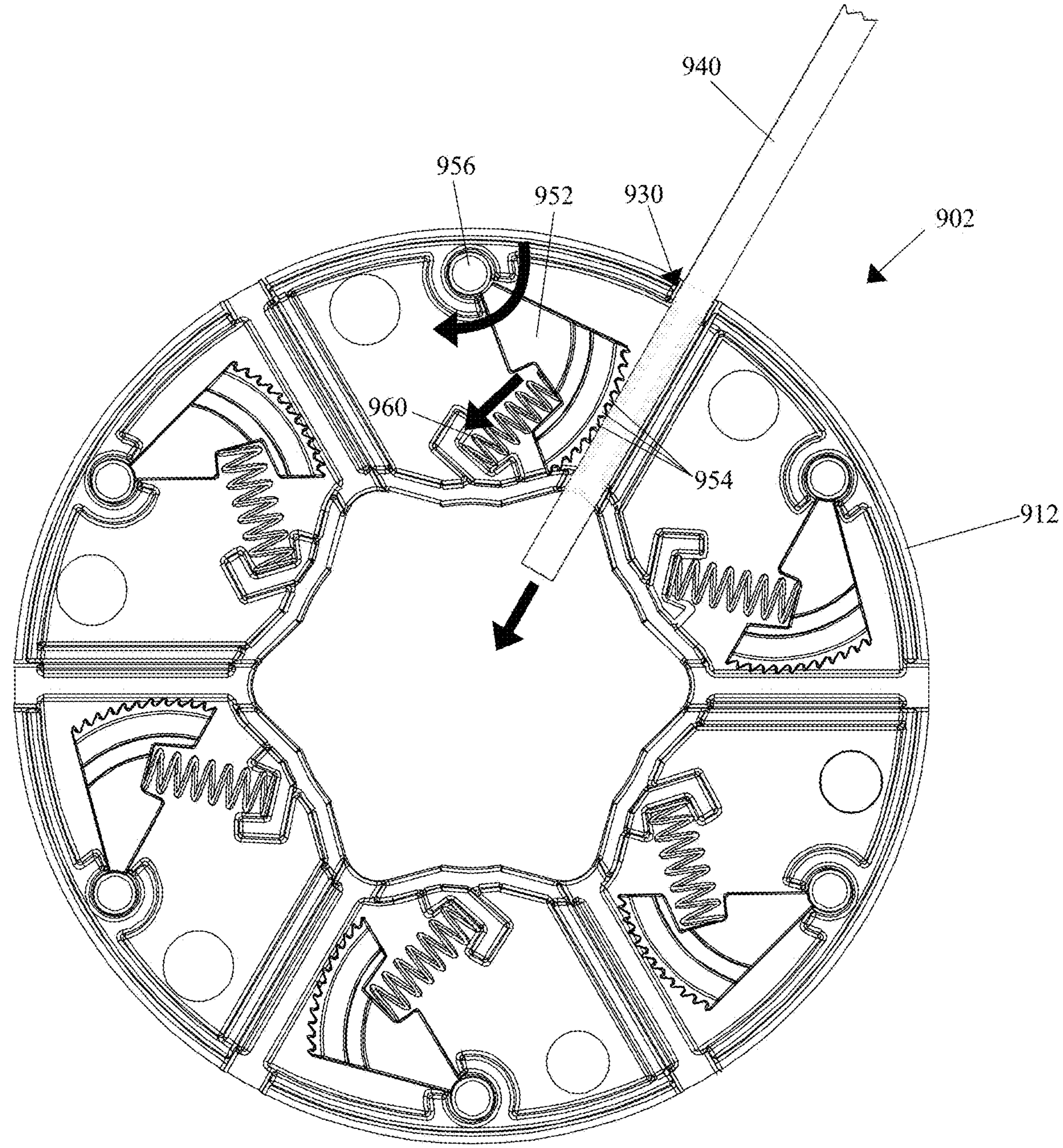
FIG. 38 is a top plan view thereof with the top portion removed, showing the filament element fully inserted therein.
Figure 39:
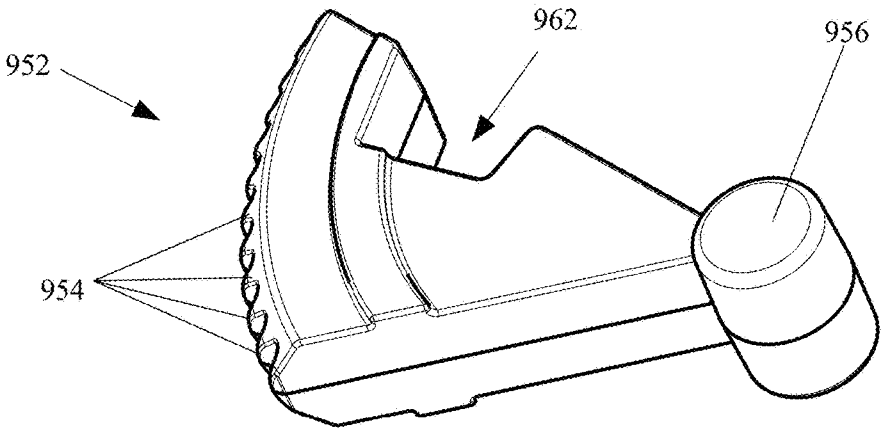
FIG. 39 is a three-dimensional isometric view of a single, toothed-cam element thereof.
Figure 40:
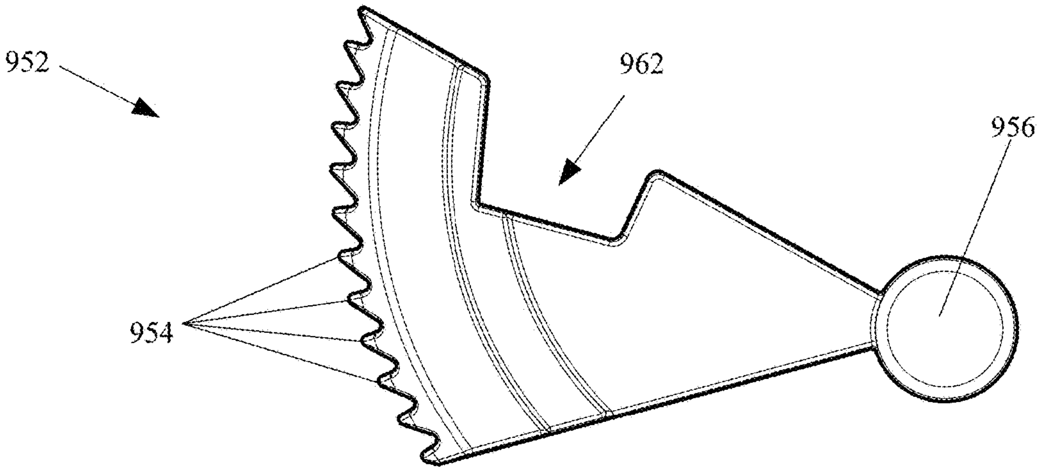
FIG. 40 is a top plan view thereof.
Figure 41:
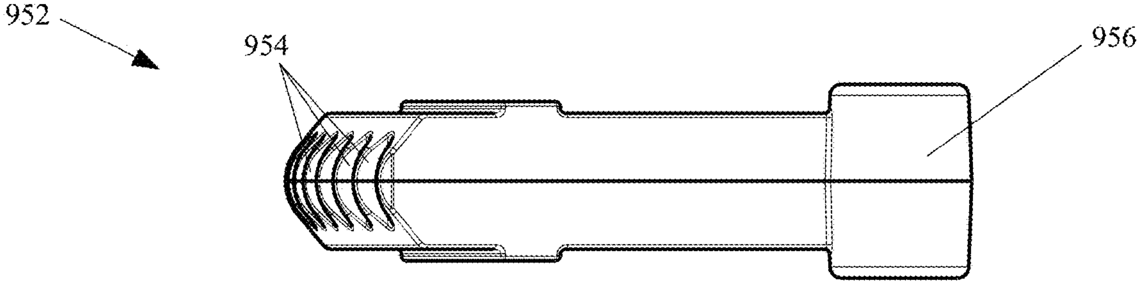
FIG. 41 is a front elevational view thereof.

FIG. 35A further shows how the filament 940 could include a proprietary diamond-shaped filament 940 with filament teeth 942 configured to align with the teeth 954 of the cam to increase the cam's ability to receive and lock the filament into place. As the toothed-filament is inserted, the filament teeth 942 engage with the cam teeth 954, which engages the two elements more completely than in prior embodiments.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A cutting head system for a lawn mowing machine comprising:

a cutting head having a disk that includes a bottom cover portion, an outer wall extending upwardly from a peripheral edge of said bottom cover portion, and a top cover portion opposite said bottom cover portion that, together, define an interior area, said cutting head defining a rotational axis passing vertically through a center of said cutting head, wherein said an outer wall defines a plurality of filament apertures spaced apart from one another about said outer wall;

a receiver fixedly attached atop said top cover portion for operatively coupling said cutting head to a rotary drive of the lawn mowing machine said receiver defining an aperture through which said rotary drive is received;

said plurality of filament apertures formed in the outer wall and distributed evenly around the outer wall;

a plurality of filament aperture receivers, each being positioned within the interior area of the cutting head and each being in communication with one of the plurality of filament apertures, respectively;

a plurality of cutting filament retention mechanisms, each being positioned in the internal area of the cutting head and each associated with one filament aperture receiver, respectively, wherein each retention mechanism includes a single fulcrum cylinder defining a fulcrum axis that is parallel to the rotational axis, said at least one cutting filament retention mechanism including one and only one filament engaging cam pivotably coupled to the one and only one fulcrum cylinder and pivotally movable between a closed configuration blocking removal of said respective cutting filament from said internal area through said respective filament receiver and an open configuration allowing removal of said respective cutting filament from the internal area through said respective filament receiver;

wherein each filament engaging cam includes an outer face and having a plurality of teeth distributed on said outer face;

said one and only one cam defining a cam receiver slot opposite said outer face thereof;

wherein each cam has a wedge shape with the fulcrum cylinder disposed at a tapered end of the wedge shape and the outer face disposed along a wide end of the wedge shape; and wherein each fulcrum axis is positioned proximal to said outer wall at a position 28° or greater relative to each respective filament aperture and the rotational axis;

a spring housing having a housing receiver slot;

a spring positioned intermediate said cam receiver slot and said housing receiver slot, said spring being normally biased to push said one and only one filament engaging cam toward said closed configuration and being configured to compress as said one and only one filament engaging cam rotates about said fulcrum axis toward said open configuration;

said proximal end of said respective cutting filament configured to be inserted through said respective filament aperture when said respective cutting filament pushes past said teeth of said one and only one filament engaging earn, thereby forcing said one and only one filament engaging earn to rotate counter-clockwise about said fulcrum cylinder, and thereby depressing said spring;

wherein said one and only one filament engaging cam is configured to pivot opposite of the rotation of said cutting head such that said one and only one filament engaging cam further engages said respective cutting filament through centripetal force; and wherein a user may selectively remove said respective cutting filament from said filament aperture by pulling said distal end of said respective cutting filament away from said filament aperture.

2. The system of claim 1, further comprising a top face of said top cover portion defining a central relief for selectively receiving a spacer into said top cover portion of said cutting head, wherein:

said spacer is removable placed within said central relief of said top cover portion of said cutting head, said removable spacer being configured for connection to a connecting end of said rotary drive; and said central relief including includes grooves configured to provide grip against said removable spacer.

3. The system of claim 2, wherein said spacer comprises a star-shaped opening.

4. The system of claim 2, wherein said spacer comprises a circular opening.

5. The system of claim 4, wherein said circular opening further comprises a plurality of notches.

6. The system of claim 1 further comprising:

a bushing configured to reduce a diameter of said receiver;

said rotary drive belonging to the lawn mowing machine; and thereby allowing said rotary drive to fit within said receiver via said bushing.

7. The system of claim 1 further comprising:

each said cutting filament includes a plurality of filament teeth; and said plurality of filament teeth being configured to engage with said teeth of said one and only one filament engaging cam, such that said teeth of said filament engaging cam further retains said cutting filament via said plurality of filament teeth.

8. The system of claim 1 wherein said lawn mowing machine is a vegetation cutting machine and said cutting head is configured to be installed on vegetation cutting machine selected from the list including a hand-held trimmer, a push lawn mower, and a riding lawnmower.

9. A cutting head system for a vegetation cutting machine comprising:

a cutting head having a disk that includes a bottom cover portion, an outer wall extending upwardly from a peripheral edge of said bottom cover portion, and a top cover portion opposite said bottom cover portion that, together, define an interior area, said cutting head defining an imaginary rotational axis passing vertically through a center of said cutting head, wherein said an outer wall defines a plurality of filament apertures spaced apart from one another about said outer wall;

a receiver fixedly attached atop said top cover portion fix operatively coupling said cutting head to a rotary drive of the vegetation cutting machine, said receiver defining an aperture through which said rotary drive is received;

a top face of said top cover portion defining a central relief for selectively receiving a spacer into said top cover portion of said cutting head;

a plurality of cutting filaments situated partially in the interior area of said cutting head, each cutting filament having a flexible construction that includes a straight body, a proximal end, and a distal end configured to extend in part through a respective, filament aperture;

a plurality of filament aperture receivers each being positioned in communication with the plurality of filament apertures, respectively, each filament aperture receiver having an elongate and tubular configuration extending outwardly and away from the respective filament aperture and away from the outer wall and configured to receive a respective cutting filament therethrough;

at least one cutting filament retention mechanism positioned in the internal area of the cutting head and that includes a single fulcrum cylinder defining a fulcrum axis that is parallel to the rotational axis, said at least one cutting filament retention mechanism including one and only one wedge-shaped filament engaging cam pivotably coupled to the one and only one fulcrum cylinder and pivotally movable between a closed configuration blocking removal of said respective cutting filament from said internal area through said respective filament receiver and an open configuration allowing removal of said respective cutting filament from the internal area through said respective filament receiver;

wherein said one and only one filament engaging cam includes an outer face and having a plurality of teeth distributed on said outer face;

said one and only one earn defining a earn receiver slot opposite said outer face thereof;

a spring housing having a housing receiver slot;

a spring positioned intermediate said earn receiver slot and said housing receiver slot, said spring being normally biased to push said one and only one filament engaging cam toward said closed configuration and being configured to compress as said one and only one filament engaging cam rotates about said fulcrum axis toward said open configuration;

said proximal end of said respective cutting filament configured to be inserted through said respective filament aperture when said respective cutting filament pushes past said teeth of said one and only one filament engaging cam, thereby forcing said one and only one filament engaging cam to rotate counter-clockwise about said fulcrum cylinder, and thereby depressing said spring;

wherein said one and only one filament engaging cam is configured to pivot opposite of the rotation of said cutting head such that said one and only one filament engaging cam further engages said respective cutting filament through centripetal force;

wherein each fulcrum axis is positioned proximal to said outer wall at a position 28° or greater relative to each respective filament aperture and the rotational axis;

wherein a user may selectively remove said respective cutting filament from said filament aperture by pulling said distal end of said respective cutting filament away from said filament aperture;

wherein said spacer is removably placed within said central relief of said top cover portion of said cutting head, said removable spacer being configured for connection to a connecting end of said rotary drive, wherein said spacer comprises a circular opening that includes the plurality of notches;

wherein said central relief including grooves configured to provide grip against said removable spacer; and a bushing configured to reduce a diameter of said receiver;

said rotary drive belonging to the vegetation cutting machine; and thereby allowing said rotary drive to fit within said receiver via said bushing;

wherein:

each said cutting filament includes a plurality of filament teeth; and said plurality of filament teeth being configured to engage with said teeth of said one and only one filament engaging cam, such that said teeth of said filament engaging cam further retains said cutting filament via said plurality of filament teeth;

wherein said cutting head is configured to be installed on a vegetation cutting machine selected from the list including a hand-held trimmer, a push lawnmower, and a riding lawnmower.

* * * * *